US011882027B2

(12) United States Patent
Zhang

(10) Patent No.: US 11,882,027 B2
(45) Date of Patent: Jan. 23, 2024

(54) END POINT TO EDGE NODE INTERACTION IN WIRELESS COMMUNICATION NETWORKS

(71) Applicant: HUAWEI TECHNOLOGIES CO., LTD., Shenzhen (CN)

(72) Inventor: Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 17/227,600

(22) Filed: Apr. 12, 2021

(65) Prior Publication Data

US 2021/0258246 A1    Aug. 19, 2021

Related U.S. Application Data

(63) Continuation of application No. 15/440,956, filed on Feb. 23, 2017, now Pat. No. 11,005,750.

(Continued)

(51) Int. Cl.
*H04L 45/30* (2022.01)
*H04W 40/00* (2009.01)
(Continued)

(52) U.S. Cl.
CPC .......... *H04L 45/30* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 7,227,863 B1    6/2007    Leung et al.
7,856,014 B2    12/2010   Kreuk
(Continued)

FOREIGN PATENT DOCUMENTS

CN    101352003 A    1/2009
CN    101668022 A    3/2010
(Continued)

OTHER PUBLICATIONS

ETSI GS NFV-SWA 001 V0.2.4(Nov. 2014), Network Functions Virtualisation (NFV); Virtual Network Functions Architecture, total 93 pages.
(Continued)

*Primary Examiner* — Jutai Kao

(57) ABSTRACT

A method and apparatus for delivering a service to an end point, such as a UE or server, via a communication network, is provided. A virtual network is pre-configured to handle service packets and includes virtual routers for routing packets via logical tunnels. The end point pre-registers with the virtual network and/or service and receives operating parameters for use in service access. The end point location may be tracked following pre-registration. The end point subsequently transmits and/or receives service packets using the operating parameters via an edge node, such as an access node or gateway. The edge node transmits service packets using the operating parameters and, upon detecting operating parameter usage by the end point, forwards received service packets to the virtual network. Operating parameters may include an identifier included in the packet. The end point may use multiple different edge nodes to access the service.

20 Claims, 26 Drawing Sheets

Related U.S. Application Data

(60) Provisional application No. 62/399,206, filed on Sep. 23, 2016, provisional application No. 62/376,820, filed on Aug. 18, 2016, provisional application No. 62/371,628, filed on Aug. 5, 2016.

(51) Int. Cl.

| | | |
|---|---|---|
| *H04W 4/70* | (2018.01) | |
| *H04W 48/18* | (2009.01) | |
| *H04W 72/23* | (2023.01) | |
| *H04L 45/02* | (2022.01) | |
| *H04L 45/586* | (2022.01) | |
| *H04W 40/20* | (2009.01) | |
| *H04L 12/46* | (2006.01) | |
| *H04L 45/745* | (2022.01) | |
| *H04L 41/0803* | (2022.01) | |
| *H04L 67/00* | (2022.01) | |
| *H04W 76/11* | (2018.01) | |
| *H04L 45/74* | (2022.01) | |
| *H04W 12/06* | (2021.01) | |
| *H04W 24/08* | (2009.01) | |
| *H04W 60/00* | (2009.01) | |
| *H04W 64/00* | (2009.01) | |
| *H04L 45/64* | (2022.01) | |
| *H04W 4/06* | (2009.01) | |
| *H04L 41/12* | (2022.01) | |
| *H04L 45/302* | (2022.01) | |

(52) U.S. Cl.
CPC ...... *H04L 12/4645* (2013.01); *H04L 41/0803* (2013.01); *H04L 45/02* (2013.01); *H04L 45/586* (2013.01); *H04L 45/74* (2013.01); *H04L 45/745* (2013.01); *H04L 67/34* (2013.01); *H04W 4/70* (2018.02); *H04W 12/06* (2013.01); *H04W 24/08* (2013.01); *H04W 40/00* (2013.01); *H04W 40/20* (2013.01); *H04W 48/18* (2013.01); *H04W 60/00* (2013.01); *H04W 64/00* (2013.01); *H04W 72/23* (2023.01); *H04W 76/11* (2018.02); *H04L 41/12* (2013.01); *H04L 45/302* (2013.01); *H04L 45/64* (2013.01); *H04W 4/06* (2013.01)

(56) References Cited

U.S. PATENT DOCUMENTS

| | | |
|---|---|---|
| 8,478,902 B1 | 7/2013 | Holland et al. |
| 8,660,129 B1 | 2/2014 | Brendel et al. |
| 8,671,176 B1 | 3/2014 | Kharitonov et al. |
| 9,077,640 B2 | 7/2015 | So et al. |
| 9,755,965 B1 | 9/2017 | Yadav et al. |
| 10,616,820 B2 * | 4/2020 | Youn ............... H04W 36/0055 |
| 2003/0041170 A1 | 2/2003 | Suzuki |
| 2004/0013120 A1 | 1/2004 | Shen |
| 2007/0153808 A1 | 7/2007 | Parker et al. |
| 2008/0098472 A1 | 4/2008 | Enomoto et al. |
| 2008/0192701 A1 | 8/2008 | Jeong et al. |
| 2010/0074274 A1 | 3/2010 | Huguies |
| 2010/0189115 A1 | 7/2010 | Kitada |
| 2011/0111758 A1 | 5/2011 | Liu et al. |
| 2011/0134931 A1 | 6/2011 | Merwe et al. |
| 2012/0082110 A1* | 4/2012 | Su ............... H04L 67/63 370/329 |
| 2012/0207026 A1 | 8/2012 | Sato |
| 2012/0275787 A1 | 11/2012 | Xiong et al. |
| 2013/0136123 A1 | 5/2013 | Ge et al. |
| 2013/0136133 A1 | 5/2013 | Alkhatib et al. |
| 2013/0346585 A1 | 12/2013 | Ueno |
| 2014/0056298 A1 | 2/2014 | Vobbilisetty et al. |
| 2014/0307556 A1 | 10/2014 | Zhang |
| 2014/0334485 A1 | 11/2014 | Jain et al. |
| 2014/0362700 A1 | 12/2014 | Zhang et al. |
| 2015/0071170 A1 | 3/2015 | Zhang et al. |
| 2015/0072705 A1 | 3/2015 | Zhang et al. |
| 2015/0143369 A1 | 5/2015 | Zheng et al. |
| 2015/0200849 A1 | 7/2015 | Wen et al. |
| 2015/0257012 A1 | 9/2015 | Zhang et al. |
| 2015/0271067 A1 | 9/2015 | Li et al. |
| 2015/0381493 A1 | 12/2015 | Bansal et al. |
| 2016/0028626 A1 | 1/2016 | Koganti |
| 2016/0105471 A1 | 4/2016 | Nunes et al. |
| 2016/0119417 A1 | 4/2016 | Fang et al. |
| 2016/0134527 A1 | 5/2016 | Kwak et al. |
| 2016/0150421 A1 | 5/2016 | Li et al. |
| 2016/0156513 A1 | 6/2016 | Zhang et al. |
| 2016/0157043 A1 | 6/2016 | Li et al. |
| 2016/0226755 A1 | 8/2016 | Hammam et al. |
| 2016/0285736 A1 | 9/2016 | Gu |
| 2017/0034053 A1 | 2/2017 | Chanda et al. |
| 2017/0093618 A1 | 3/2017 | Chanda et al. |
| 2017/0118043 A1 | 4/2017 | Hao et al. |
| 2017/0181210 A1 | 6/2017 | Nadella et al. |
| 2017/0250838 A1 | 8/2017 | Khawer et al. |
| 2017/0374696 A1 | 12/2017 | Doll et al. |
| 2018/0199276 A1 | 7/2018 | Zhang |
| 2019/0028943 A1* | 1/2019 | Wang ............... H04W 8/065 |
| 2019/0289534 A1* | 9/2019 | Ryoo ............... H04W 76/28 |

FOREIGN PATENT DOCUMENTS

| | | |
|---|---|---|
| CN | 101808030 A | 8/2010 |
| CN | 102315925 A | 1/2012 |
| CN | 102469004 A | 5/2012 |
| CN | 102546735 A | 7/2012 |
| CN | 102549990 A | 7/2012 |
| CN | 102611629 A | 7/2012 |
| CN | 102948132 A | 2/2013 |
| CN | 103001883 A | 3/2013 |
| CN | 103444143 A | 12/2013 |
| CN | 103491006 A | 1/2014 |
| CN | 103534997 A | 1/2014 |
| CN | 103607349 A | 2/2014 |
| CN | 103685026 A | 3/2014 |
| CN | 103716213 A | 4/2014 |
| CN | 104104534 A | 10/2014 |
| CN | 104285416 A | 1/2015 |
| CN | 104363159 A | 2/2015 |
| CN | 105227454 A | 1/2016 |
| CN | 105306333 A | 2/2016 |
| CN | 105531961 A | 4/2016 |
| JP | 2003069609 A | 3/2003 |
| JP | 5125793 B2 | 1/2013 |
| WO | 2009054032 A | 4/2009 |
| WO | 2013142519 A1 | 9/2013 |
| WO | 2014049432 A2 | 4/2014 |
| WO | 2015178033 A1 | 11/2015 |
| WO | 2015180617 A1 | 12/2015 |
| WO | 2016014362 A1 | 1/2016 |

OTHER PUBLICATIONS

"5G Wireless Network: MyNET and Sonac", IEEE Network vol. 29, Issue: 4, Jul.-Aug. 2015, pp. 14 to 23.
E. Rosen et al., "BGP/MPLS IP Virtual Private Networks (VPNs)", Request for Comments: 4364, Network Working Group, Feb. 2006, total 47 pages.
Hang Zhang et al., "5G wireless network: MyNET and Sonac", IEEE Network ( vol. 29 , Issue: 4 , Jul.-Aug. 2015 ) , total 10 pages.
International Search Report dated Oct. 27, 2017 for corresponding International Application No. PCT/CN2017/096172 filed Aug. 7, 2017.
International Search Report dated Oct. 26, 2017 for corresponding International Application No. PCT/CN2017/096171 filed Aug. 7, 2017.
International Search Report dated Sep. 28, 2017 for corresponding International Application No. PCT/CN2017/096056 filed Aug. 4, 2017.

(56) References Cited

OTHER PUBLICATIONS

International Search Report dated Oct. 23, 2017 for corresponding International Application No. PCT/CN2017/096055 filed Aug. 4, 2017.
International Search Report dated Oct. 26, 2017 for corresponding International Application No. PCT/CN2017/096173 filed Aug. 7, 2017.
Zhang et al., "5G Wireless Network: MyNET and Sonac", IEEE Network vol. 29, Issue: 4, Jul.-Aug. 2015, pp. 14 to 23.

* cited by examiner

END POINT TO EDGE NODE INTERACTION IN WIRELESS COMMUNICATION NETWORKS

CROSS-REFERENCE TO RELATED APPLICATIONS

This application is a continuation of U.S. patent application Ser. No. 15/440,956 filed Feb. 23, 2017 and claims priority from U.S. Provisional Patent Application No. 62/371,628 filed on Aug. 5, 2016 and to U.S. Provisional Patent Application No. 62/376,820 filed on Aug. 18, 2016, and to U.S. Provisional Patent Application No. 62/399,206 filed on Sep. 23, 2016, all of which are herein incorporated by reference.

FIELD

The present invention pertains to the field of wireless communication networks and in particular to methods and systems for service delivery in wireless communication networks.

BACKGROUND

In current 3G/4G networks, traffic is delivered to user equipment (UE) on a per-device session basis between the UE and a service provider, such as a server. A service session is established after completion of an end-to-end connection setup procedure between the UE and the service provider. This connection procedure typically introduces a latency of about 200 ms and causes considerable network overhead on the link between the UE and the service provider.

It is expected that there will be a significant increase in the number of UEs requiring service in next generation networks (e.g. 5G), such as sensors, machines, mobile devices, and other devices that will require connection. Furthermore, the data traffic will likely may become more bursty in nature with a much higher number of sessions to be served as the demand for continuous or near-continuous connectivity increases.

One of the objectives of next generation networks (e.g. 5G networks) is to provide service-based delivery of content, and avoid the overhead of per-device sessions.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments, there is provided a system and method for communicating between edge nodes and end points in support of service delivery in a communication network which supports a virtual network. According to one embodiment, there is provided a method for operating an edge node of a communication network to support access to a service by an end point communicatively coupled to the edge node. The method can be performed by the edge node. The method includes monitoring for reception of a packet associated with the service and transmitted by the end point. The method further includes, upon detection of reception of the packet, submitting the packet to a pre-configured virtual network to access the service.

According to another embodiment, there is provided a method for operating an edge node of a communication network to support access to a service by an end point communicatively coupled to the edge node. The method can be performed by the edge node. The method includes monitoring for a packet associated with the service and identifying the end point as a packet destination. The method further includes, upon detection of the packet, determining parameters for use in communicating the second packet to the end point, and transmitting the packet in accordance with the determined parameters. The packet is received from a pre-configured virtual network supporting the service.

According to another embodiment, there is provided a method of operating an end point to access a service via a communication network including an edge node communicatively coupled to the end point. The method can be performed by the end point. The method includes transmitting a registration message to the edge node to register the end point with the service. The method further includes receiving from the edge node operating parameters for use in accessing the service. The method further includes transmitting or receiving a packet in accordance with the operating parameters.

According to another embodiment, there is provided an edge node of a communication network. The edge node can include a processor, a memory and one or more communication interfaces, such as network interfaces and/or wireless communication interfaces. The edge node includes a service monitor configured to monitor for a packet associated with a service and transmitted by an end point communicatively coupled to the edge node, the packet. The edge node further includes a virtual network interface controller configured, upon detection of the packet by the service monitor, to: submit the packet to a virtual network using a network interface of the edge node, the virtual network configured to automatically handle the packet according to the service.

According to another embodiment, there is provided an end point for operation with a communication network to access a service by communication with an edge node of the network. The end point includes a registration and configuration controller. The controller is configured to transmit, via a communication interface of the end point, a registration message to the network to register the end point with the service. The controller is further configured to receive from the network, via the communication interface, operating parameters for use in accessing the service. The end point further includes a service communication controller configured to transmit or receive, via the communication interface, a packet in accordance with the operating parameters, thereby causing the packet to be associated with the service.

BRIEF DESCRIPTION OF THE FIGURES

Further features and advantages will become apparent from the following detailed description, taken in combination with the appended drawing, in which.

DETAILED DESCRIPTION

Figure 1A:
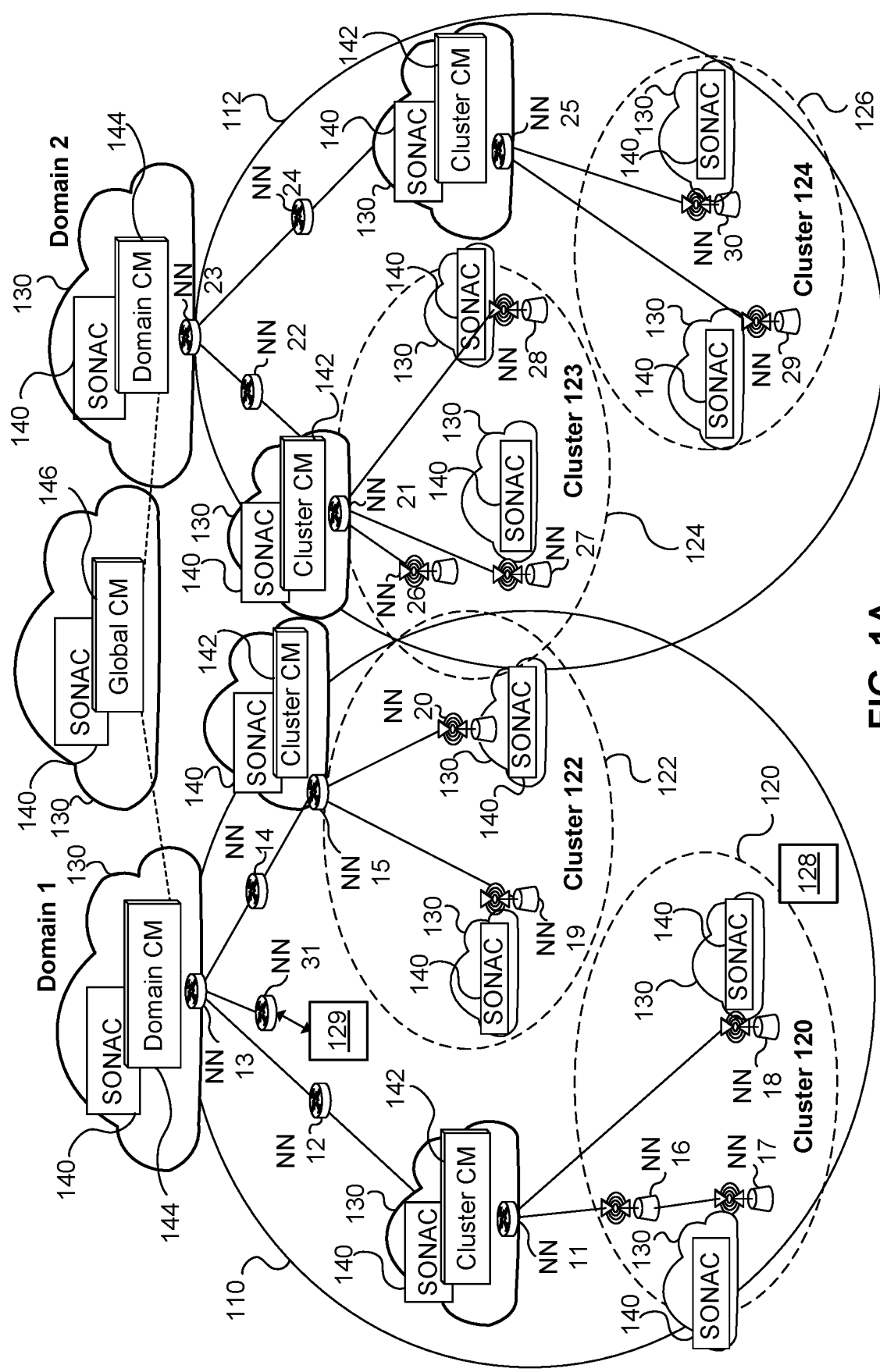
FIG. 1A illustrates a network which is configurable according to embodiments of the present invention.

As used herein, a communication network (or simply a "network") refers to a collection of communicatively coupled devices which interoperate to facilitate communication between various end point devices, such as User Equipment devices. The term "User Equipment" (UE) is used herein for clarity to refer to end point devices which are configured to communicate with a network either via fixed line connection, or via radios operating according to a predetermined protocol. UEs include UEs as defined by the $3^{rd}$ Generation partnership project (3GPP), mobile devices (e.g. wireless handsets) and other connected devices, including Machine-to-Machine (M2M) devices (also referred to as Machine Type Communications (MTC) devices). A mobile device need not be mobile itself, but is a device that can communicate with a network which is capable of providing communication services as the device moves. A network may include, for instance, at least one of a radio access portion which interfaces directly with UEs via radio access and a fixed line portion which interfaces directly with UEs via fixed line access, in combination with a backhaul portion which connects different network devices of the network together. The network may further comprise various virtualized components as will become readily apparent herein. A primary forward looking example of such a network is a Fifth Generation (5G) network.

It has been proposed that 5G networks be built with various network technologies that allow for the network to be reconfigured to suit various different needs. These technologies can also allow the network to support network slicing to create different sub-networks with characteristics suited for the needs of the traffic they are designed to support. The network may include a number of computing hardware resources that provide processors and/or allocated processing elements, memory, and storage to support functions executing on the network, as well as a variety of different network connectivity options connecting the computing resources to each other, and making it possible to provide service to mobile devices.

A service generally corresponds to a source, or a sink, for specified data communications that is available on the network. Accessing a service may involve communication between multiple end points that are connected to the network. A service may be provided by the network operator, or may be provided by network customer such as a business, utility, government, or other organization. Examples of services include, but are not limited to, providing audio and/or video content to stream or download to an end point such as a UE, storage and/or processing of data from an end point such as a UE, UE-to-UE messaging services, machine-to-machine communications such as utility meter reporting, remote data storage, and/or remote computing services.

A network slice generally corresponds to a set of network resources which have been allocated to support at least one specific service on the network. Such network resources may include cloud-based communication, computing and memory resources, physical connection and communication resources, wireless radio access resources such as frequency, time and code multi-access resources, telecommunication resources, memory resources and computing resources.

As used herein, the term virtual network (VN) refers to a pre-configured network topology including a collection of pre-configured virtual network nodes which are communicatively interconnected to support one or more network slices. The VN is identified by a VN identifier (VN ID). If the VN supports a single network slice (i.e. a single service), that slice may also conveniently be identified by the VN ID. If the VN supports a plurality of network slices, a service identifier (service ID) may be used to differentiate between each of the supported plurality of network slices, to identify which slice is allocated to which service as supported by that VN. The plurality of network slices are logically separated from one another within the VN, but all of the network slices within a VN share a common set of network resources that have been configured for that VN. In this case, a slice can be identified using a combination of a VN ID and a service ID.

More particularly, a VN is composed of a collection of VN nodes each of which is associated with one of a corresponding collection of physical network nodes that make up the network. The VN nodes are communicatively interconnected, either directly or indirectly via other VN nodes. Each VN node is associated with, and communicatively linked to, a corresponding physical network node of the network. In some embodiments, operational capacities of the VN nodes may be co-located with their associated physical network node. In some embodiments, operational capacities of one or more of the VN nodes may be physically separated from their associated physical network node. The VN may further include definitions and functional elements to provide connecting tunnels, associated routing functions, packet aggregation functions, packet de-aggregation functions, firewall functions, anchor point functions, in-network processing elements, admission control, and access link scheduling and management, that is arranged to support the one or more network slices across the collection of VN nodes.

For example, the association may be such that a packet received at a physical network node is provided to the VN node associated with that physical network node for processing (e.g. under predetermined conditions), and packets provided by the VN node may be transmitted by the physical network node as instructed by the VN node, or the pre-configured rules for that VN. The VN nodes can be instantiated using computing, communication, and memory resources such as network function virtualization resources. These resources can be located in a cloud, such as a datacenter or local cloud. The local cloud may include generic hardware proximate or co-located with the associated network node. A VN node may comprise a network function or a group of network functions. The logical topology of a VN refers to the interconnection among multiple VN nodes which are distributed at various associated physical network nodes.

A VN tunnel refers to a logical communication link between two VN nodes. An open VN tunnel refers to a logical communication link between a VN node and another network node which is neither associated with a VN node nor a VN specific network function. The other network node may be, for instance, an edge node of the network, such as an access node or a gateway. Edge nodes provide connectivity for mobile or fixed end points (or "end nodes") to connect to the network. End points may include, for instance, UEs and other devices external to the network, such as application servers, which attach to the VN access the service(s) supported on that VN.

A network entity generally refers to a network node, or a combination of network nodes, that is operative to provide specified services on the network. A network entity comprises physical components, such as processors, allocated processing elements, or other computing hardware, computer memory, communication interfaces, and other supporting computing hardware. The network entity may use dedicated physical components, or the network entity may be allocated use of the physical components of another device, such as a generic computing device or resources of a datacenter, in which case the network entity is said to be virtualized. A network entity may be associated with multiple physical components that may be located either in one location, or may be distributed across multiple locations.

A network function comprises a service that may be provided by a network entity, or may comprise physical components configured in a certain way to provide a given functionality, which may be described in terms of data inputs and outputs. In general, a network entity may be operative to support one or more network functions on the network.

Embodiments of the present invention provide for delivery of one or more services from at least one network entity available on a network. Rather than the network acting only to connect end points to the network entity, the network is configured to participate in providing the service. In particular, a VN is instantiated and pre-configured on the network for providing delivery of the service(s). The VN is pre-configured in such a way that end points are able to connect to a desired service with limited to no signaling across the network at the time of service usage, and therefore limited latency. This is enabled by the pre-establishment of the VN on the network, which effectively extends the service from the network entity across the network to the point of attachment by the end point. Pre-configuration of edge nodes may also enable this feature. When the end point attaches to the VN, it gains access to the service, without signalling between the end point and the network entity that provides the service.

Because the network participates in service delivery, the service is expanded into the network by the use of virtual network nodes. The virtual network nodes can recognize incoming data packets associated the service and route them appropriately via the pre-established tunnels.

The pre-configured VN is operative to recognize incoming data packets associated the service and to route them appropriately via the pre-established tunnels. This operation is supported by VN routing functions (v-routers) and VN tunnels which are established for providing the service. The VN nodes can also perform other functions of the service such as packet aggregation or de-aggregation, firewall and security, anchor point operation, in-network processing and data storage, admission control, and access link scheduling and management. The v-routers are configured to route packets between the VN nodes via the tunnels, in a hop-by-hop manner. Packets are routed toward an appropriate destination, such as but not necessarily limited to a destination specified in the packet using a name identifier or explicit destination identifier. Physical network resources, such as network nodes, are configured to provide the VN tunnels as part of the VN tunnel definition. VN tunnels can be supported by a chain of physical network nodes which are configured to forward tunneled packets toward the VN tunnel egress. In some embodiments, each physical network node supporting a tunnel may be configured with a set of routing rules which associates a VN tunnel identifier or destination network node identifier with a next network node. When a packet specifies the VN tunnel identifier or destination network node identifier, it is forwarded to the associated next network node.

For example, when the service involves processing of data transmitted by UEs in a certain manner, and providing results of this data processing to the UE or another UE, some or all of the processing may be done at virtual network nodes proximate to the network edge, thereby reducing service latency. The location of VN nodes performing in-network data processing and/or data caching can be selected based on criteria such as but not limited to: performance, cost, latency, communication overhead, and quality of service.

In various embodiments, the pre-configuration of the VN provides a network infrastructure that stands ready to handle packets according to a requested service. This allows end points to reduce signaling because the details of how the packet is to be treated are specified in advance when the VN is pre-configured. This also allows for lower latency, because tunnel set-up, service function set-up, end point tracking, etc. are performed in advance. Each VN node is in standby across the network ready to receive and handle any packets directed to a service supported by that VN. In addition, because service functions can be embedded in the network (even possibly at the edge nodes or in radio access network (RAN) clusters), data forwarding and associated latency and network resource usage can be reduced.

Network pre-configuration may be performed by a network entity referred to as a Service Oriented Network Auto Creation entity (SONAC). The SONAC is described for example in Zhang, Hang, et al., "5G Wireless Network: MyNET and SONAC", IEEE Network Volume: 29, Issue: 4, July-August 2015, pp 14 to 23, which is incorporated herein by reference. The SONAC may perform and/or direct underlying network resources to instantiate and configure the VN as described herein. As used herein, SONAC functionalities can be subdivided into functions used for network slice composition, referred to as SONAC-Com, and functionalities used for network slice operation, referred to as SONAC-Op. The SONAC may comprise operations for performing software-defined topology definition (SDT), software-defined resource allocation (SDRA), and software-defined protocol definition (SDP). SDT, SDRA and SDP in support of SONAC-Com and SONAC-Op are referred to as SDT-Com, SDRA-Com, SDP-Com, SDT-Op, SDRA-Op and SDP-Op, respectively. SONAC-Op may be dedicated to managing a single network slice, or common to multiple network slices managed thereby. SONAC-Op may be supported on its own network slice or on a network slice used to support multiple entities. The concept of network slices provides operators the flexibility to provide network infrastructure resources that may be tailored to satisfy the wide variety of customer service and quality requirements.

The present application describes a "Hop-On" concept which allows end-point devices (e.g. UE) to connect and disconnect from the slice (VN) directly, rather than needing to complete end-to-end connections as is presently the case. This significantly simplifies the data traffic delivery procedure and reduces signaling overhead and latency across the network. In the Hop-On VN traffic delivery system and method, access to a service does not require per-UE per-session establishment, and does not require end-to-end connection setup between the UE and the service provider. There is no session setup as the session is effectively "pre-existing" as a VN slice pre-established on the network. The VN slice supported by a pre-defined VN topology configured on the network. The UE only needs to negotiate its entry or exit from the slice which may occur at a localized level (e.g. at the edge of the VN). The connection between the slice access point and the service provider is established and maintained by the control functions managing the slice.

Slicing and Hop-On together enable:
  Scalability—Physical Network Nodes (NNs) are operative on the service level (integrated data traffic of a service), instead of on device/session level
  Simplicity—Per device/session end-to-end tunnel establishment is removed or minimized
  Flexibility—service-customized VN/slice—allows the communications network to be adjusted for individual services, to provide a best fit for the needs of customers and network operators For example, end-points of a VN designed for such services can hop-on the VN by sending data packets using a pre-assigned Access Link (AL) resource for that VN. The end-point UE can register and connect with a local node at the edge of the VN, rather than the destination end point of their communications. Once data packets for a service are submitted to the network, the packets are routed to the intended destination(s) along pre-defined VN tunnels, and can be separated by service or QoS as required. For VNs where there is no pre-assigned AL resource, a simplified set of signaling message exchanges on the AL may be used to enable data packet transmission over the AL. From the point of view of communicating devices, the network is always ready to receive and deliver data traffic.

Once the VN has been established, data traffic delivery to a mobile UE relies upon the selection of the right tunnel(s) when routing the data traffic, instead of the re-establishment of new per-device end-to-end connections. Accordingly end points, such as UE or business customers, are able to exchange traffic with a local NN without regard for the location of the intended recipient, or the condition of the network between the sender and the recipient. Similarly, NNs located logically distant from the destination end point do not need to know the logical or physical address of the destination end point. Instead, these NNs need only follow the pre-defined rules for handling packets and direct the packets to an assigned NN that is operative to maintain or obtain the current location of the destination end point.

When communicating to mobile UE, one or more tunnels connecting Access Points (APs) of a Radio Access Network (RAN) cluster can be selected by a v-router at the cluster level to selectively enable data delivery to the one or more APs. Accordingly, the decision-making regarding the best mode to reach a recipient UE may be decided at the lowest level which has the most accurate position and mobility information related to the recipient UE. With this functionality, true handover-free service access is enabled. The end-points of the communication can communicate with a correspondent party using a name (UE ID and a service ID) in place of location information. The hierarchical VN architecture enables the v-routers to handle the traffic on an end-point name basis, and access name-based location tracking and resolution from the CM's configured for that VN.

By using a pre-defined VN, data packets from specific applications, such as peer-to-peer communication (e.g. wechat), can be directly routed to the destination end point via efficient tunnel routing, i.e., shortest route without going through un-necessary paths. CM techniques provide the location information to VN routers to enable the efficient data delivery.

From the endpoint (e.g. UE or server) perspective, the hop-on process starts with network registration: to obtain authentication and authorization to use the network, followed by registration to a CM slice to start reach-ability operation to enable the network to track the endpoint's location. The location tracking may be initiated before the endpoint is registered to a user plane (UP) of the VN (slice). The next step is registration to a UP slice to authorize the endpoint to use the UP slice and obtain information on any requirements for admission control (AC) for follow-up service data transmission. If no further AC is required, the end-point can Hop-On, or access, the slice to directly send data over the VN. For most MTC cases, the above procedure can be simplified. If further AC is required for a service, before sending any data traffic an AC procedure is needed (e.g. for some bulk data transmission over a slice with limited VN capacity, an AC is needed before access is provided to the slice).

Embodiments of the present invention relate to the interactions between an end point, such as a UE, computing device, or customer server, and an edge node, such as an access point of a radio access portion of a communication network. In some embodiments, the end point may be a server or other networked device, and the corresponding edge node may be a gateway of the communication network. Some embodiments provide for an end point or method of operating same, while other embodiments provide for an edge node or method of operating same. The interaction between edge nodes and end points supports VN operation, so as to allow end points to access the VN and to convey packets between the end points and the VN.

FIG. 1A illustrates an example of a network infrastructure which may be configured and utilized according to some embodiments. It should be understood that this network infrastructure and its topology is used as an example only, and is not intended to limit the present invention.

To assist with tracking the location of UE accessing the network, the network can be divided into domains, such as Domain 1 110 and Domain 2 112 illustrated in FIG. 1A. Each domain may be further sub-divided into RAN clusters 120, 122, 123, 124. For expediency, FIG. 1A illustrates two domains and two hierarchical layers, namely a domain layer and a cluster layer, however other embodiments may include various numbers of domains and more or fewer layers, as may be applicable for a particular network. The specific domain division and sub-division may be implementation-specific and based on network requirements.

FIG. 1A illustrates multiple physical network nodes (NNs) labelled NN 11 to NN 30. FIG. 1A further illustrates multiple network entities which are provided in the form of VN functions supported by computing resources 130. The network entities 140, 142, 144, 146 are instantiated using the computing resources 130 such as reconfigurable in-network resources, or cloud or datacenter resources. The computing resources 130 may comprise, for instance, a data center, server, or virtualized cloud resources available to particular NNs. Generally, VN nodes are associated with a corresponding computing resource 130, and accordingly physical nodes that are not allocated computing resources 130 would not be allocated as VN nodes.

The illustrated network entities include SONAC entities 140 and connection management (CM) entities including cluster CM entities 142, domain CM entities 144 and a global CM entity 146. Each network entity 140, 142, 144 may associate with the network node at which it is located. The global CM entity 146 may associate with another network node (not shown), or may be supported as a separate management node that manages and directs operations in the two Domains 110, 112.

The SONAC architecture formed of SONAC entities 140 is used for pre-configuring and managing VNs which include VN nodes associated with at least some of the network nodes. The SONAC may also manage operations of the physical network nodes NN 11 to NN 30. The interconnections between SONAC entities at different layers of the architecture are not shown for the sake of clarity. SONAC-Com functions supported by the SONAC entities 140 and CM functions supported by the CM entities 142, 144, 146 can be pre-realized before any service slice is defined and implemented. SONAC-Op can be pre-realized if it controls and manages all slice operations. Alternatively, a SONAC-Op can be created together with a service slice if the SONAC-OP is dedicated to that service slice.

The network infrastructure further includes a hierarchical CM entity formed of CM entities 142, 144, 146. The interconnections between CM entities at different layers of the architecture are not shown for the sake of clarity. The CM entity may be configured to track current locations of end points such as UEs, and to provide such location information to network nodes and/or SONAC components as required.

The network infrastructure further includes RAN clusters 120, 122, 123, 124, which include multiple radio access network nodes ("access nodes") in a common area. The access nodes in the RAN cluster are interconnected via wired or wireless communication links. Alternatively, at least some access nodes may be provided in a non-clustered configuration. The access nodes may each include their own full or partial baseband processing infrastructure, and some or all of the baseband processing infrastructure may be shared by multiple access nodes. The access nodes may be provided with or without computing resources 130, or may share a set of computing resources 130 made available to multiple access nodes. RAN clusters can be used as part of the VN. Further, packets may in some cases be wirelessly transmitted to and from RAN clusters using multipath, multicast or broadcast transmissions.

Network node NN 31 is illustrated as an example of an edge node which is not part of a RAN cluster. NN 31 may be, for example, a gateway which is connected to the Internet or another external communication network. Further illustrated is an end point 128 such as a UE which wirelessly communicates with one or more of the edge nodes NN 16, NN 17 and NN 18 in RAN cluster 120. Further illustrated is an end point 129 such as a server, which communicates with the edge node NN 31, for example via the external network. Due to mobility, end point 128 may enter cluster 122 and connect to one or more associated edge nodes, such as NN 19 and/or NN 20.

Figure 1B:
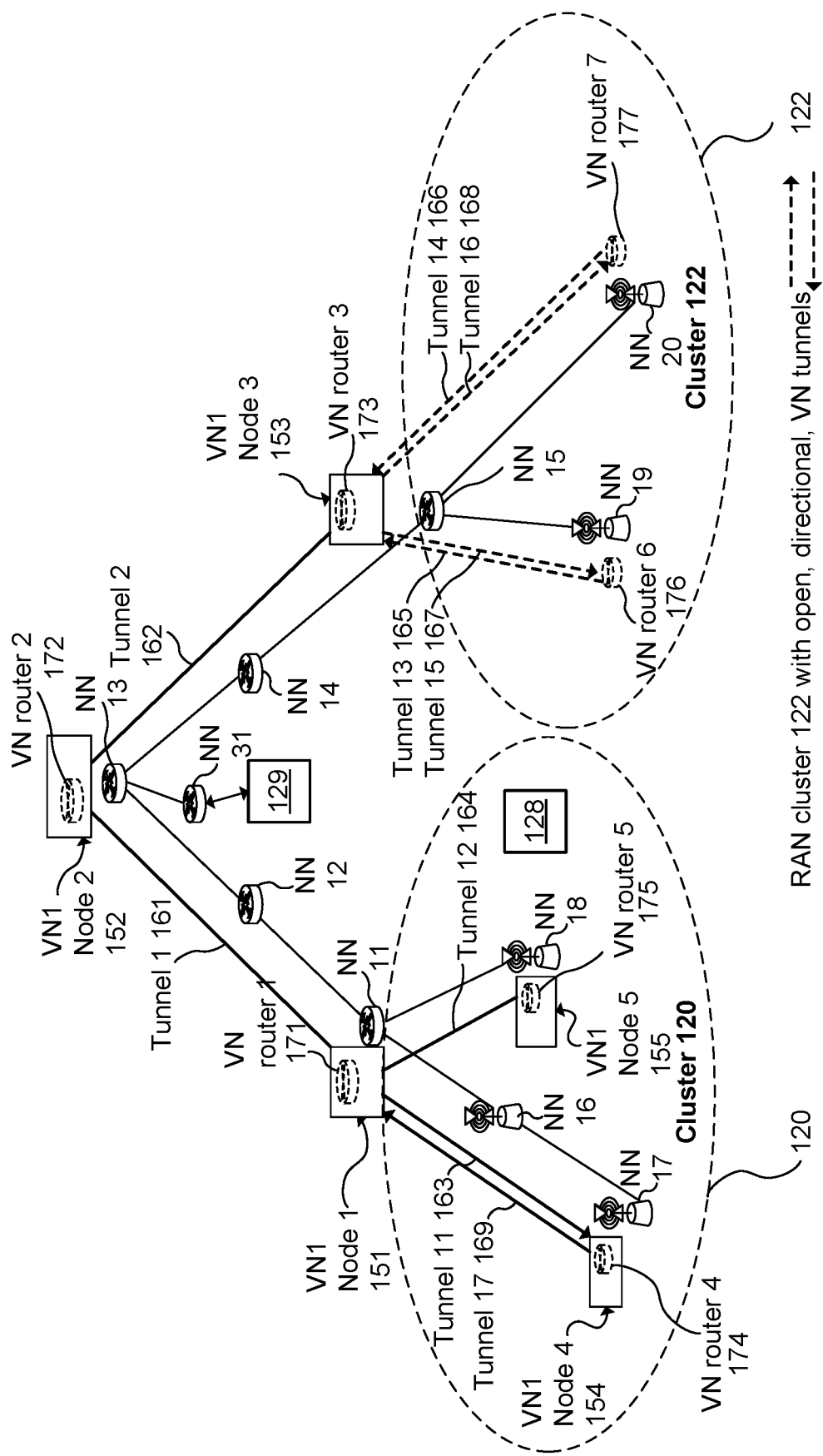
FIG. 1B illustrates configuration of a network according to embodiments of the present invention.

FIG. 1B, illustrates a VN having VN ID equal to one. This VN is referred to as VN1, to illustrate that multiple VNs may be supported. VN1 Nodes 1 to 5 151, 152, 153, 154, 155 are each associated with a corresponding one of the NNs. For instance, VN1 Node 1 151 associates with NN 11 and cluster 120, VN1 Node 2 152 associates with NN 13 and may further be assigned a cluster ID of 121 to indicate that it is outside of both cluster 120 and cluster 122, VN1 Node 3 153 associates with NN 15 and cluster 12, VN1 Node 4 154 associates with NN 17 (an access node) and cluster 122, and VN1 Node 5 155 associates with NN 18 (an access node) and cluster 120. The VN logical topology, including VN nodes and VN tunnels, is illustrated on top of the network infrastructure of physical network nodes and communication links.

VN tunnels 161, 162, 163, 164, 165, 166, 167, 168, 169 connect VN1 Nodes 1 to 5 151, 152, 153, 154, 155. For instance, tunnel 1 161 has an ingress at VN1 Node 2 152 and an egress at VN1 Node 1 151, tunnel 2 162 has an ingress at VN1 Node 2 152 and an egress at VN1 Node 3 153, tunnel 11 163 has an ingress at VN1 Node 1 151 and an egress at VN1 Node 4 154, and tunnel 12 164 has an ingress at VN1 Node 1 151 and an egress at VN1 Node 5 155. VN tunnels may be bi-directional, such as tunnel 1 161, or uni-directional, such as tunnel 11 163.

V-routers 1 to 5 171, 172, 173, 174, 175 are instantiated and each associated with one of VN1 nodes 1 to 5 151, 152, 153, 154, 155. V-routers 6 & 7 176, 177 and labelled as "VN routers 6 and 7" are instantiated and associated with network nodes NN 19 and NN 20, respectively. The v-routers may be instantiated using cloud-based or datacenter-based resources, for example. In some embodiments, v-routers may be instantiated at least partially using resources which are co-located with the physical network nodes.

The VN may support at least one service slice. In cases where a plurality of service slices are supported, an additional service identifier (service ID) may be used to differentiate between service slices handled by that VN. In the case where only one service slice is supported by the VN, then the service identifier can be omitted as the VN ID inherently identifies the service slice supported by that VN. End points are able to reduce signaling, because rather than specifying details of how the packet is to be treated, the service identifier (e.g. derived from packet characteristics) is used to trigger packet handling according to the service. This also allows for lower latency, because tunnel set-up, service function set-up, end point tracking infrastructure establishment, etc. are performed in advance, such that end points know handle to traffic directed toward a specified service. In addition, because service functions can be embedded in the network (even possibly at the edge nodes or in RAN clusters), data forwarding and associated latency and network resource usage can be reduced.

Figure 2:
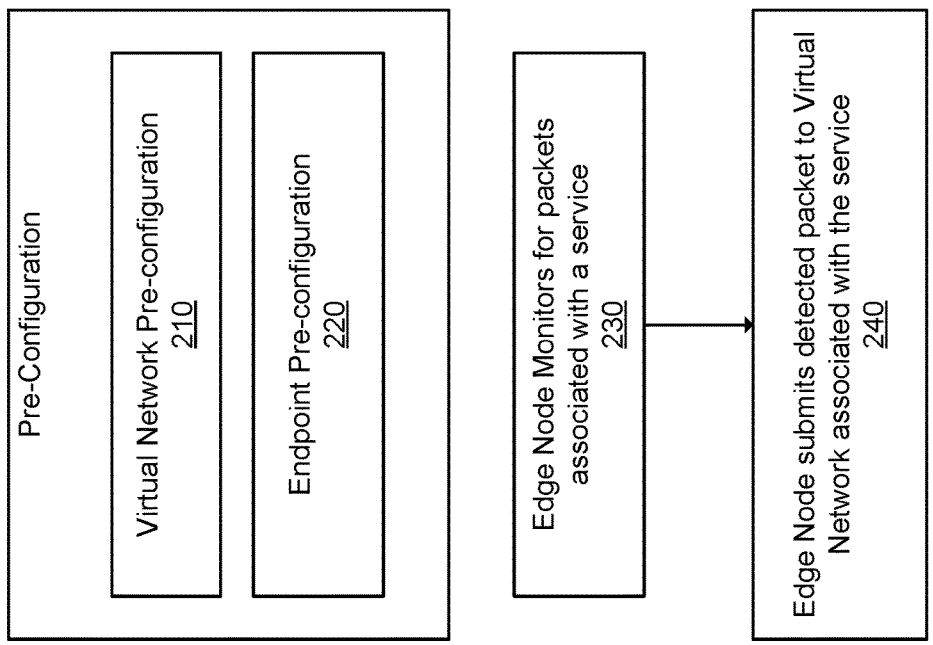
FIG. 2 illustrates operation of an edge node such as an access node or gateway, according to embodiments of the present invention.

According to embodiments of the present invention, and having reference to FIG. 2, an edge node of the communication network is configured to monitor 230 for data packets, transmitted from an end point, which are associated with a service supported by a virtual network. For example, the data packets may include an identifier such as a service ID which is associated with the service. Additionally, or alternatively, the data packets may be transmitted using dedicated access link resources, such as time slots, frequency bands, or spreading codes, which are associated with the service. Monitoring 230 for such packets may include monitoring the header or payload for the identifier and/or monitoring the access link resources used to transmit the packet, by monitoring characteristics such as the timing of packet receipt, frequency range of receipt, and/or de-spreading code used to decode the packet. Monitoring may include monitoring a pre-established radio bearer associated with the end point and/or service. Monitoring may include monitoring incoming communications for a radio ID associated with the end point.

Upon detection of a packet as being associated with a particular service, due to monitoring, the edge node submits 240 the packet, or at least its payload, to a virtual network (VN) which has been pre-configured 210 to automatically handle packets according to the service. The packet may be encapsulated by the edge node prior to submission. Alternatively, the packet may be encapsulated once it reaches the VN. Encapsulation may include adding a VN tunnel header to the packet.

Submitting 240 the packet to the VN includes transmitting the packet to a VN node communicatively coupled to the edge node. In some embodiments, the VN node is associated with the edge node. In other embodiments, the VN node is associated with a different node which is communicatively coupled to the edge node. The VN node may be coupled to the edge node via an open tunnel of the VN, for example. Submitting the packet may include selecting one of the VN nodes or tunnels of the VN and submitting the packet to the selected VN node or tunnel.

The end point may be configured to associate its transmitted data packets with the service during a pre-configuration operation 220. In the pre-configuration operation, the edge node, another edge node, or another device such as a configuration device, facilitates configuration of the end point by directly configuring the end point or causing the end point to self-configure based on provided information. In particular, the end point is configured to transmit packets, which are to be associated with the service, in a particular manner. This may include inserting an identifier such as a service ID into the packet header or payload and/or transmitting the packet using a particular set of access link resources which are associated with the service. The end point may register with the network, a connectivity manager, and/or a virtual network concurrently with or as part of the pre-configuration operation. The end point may transmit a configuration request message to the edge node or other device, and the edge node or other device may respond with configuration information, such as the service ID to be used by the end point.

Embodiments support communication from a service to the end point via the edge node in addition to or alternatively to communication from the end point to the service via the edge node. The end point pre-registers with the service, for example during pre-configuration. In some embodiments, if the end point is mobile, it is tracked by a connectivity manager (CM) entity following pre-registration. That is, a CM operating on the network tracks a location of the end point beginning at pre-registration and the VN is configured to route packets to the end point based on the tracked location. Packets destined for the end point are routed via the pre-established VN to an edge node which is communicatively linked to the end point. The routing is performed by VN routers (v-routers) over the pre-established tunnels and is informed by the CM.

It should be noted that in some embodiments multiple end points may be employed as described above, and that multiple edge nodes operatively coupled to the virtual network may be provided. The VN may be pre-established, and the edge nodes pre-configured, in order to support multiple, possibly mobile end points accessing a common service.

In some embodiments, an end point may be operative to communicate with a service without requiring the dynamic establishment of communication sessions on an as-needed basis. Rather, the VN, including tunnels and v-routers thereof, and the edge nodes, are pre-configured to accept and handle packets from the end points. The end point thus transmits its appropriately configured packet for handling by the pre-configured network. As such, latency associated with session set-up is mitigated.

Figure 3:
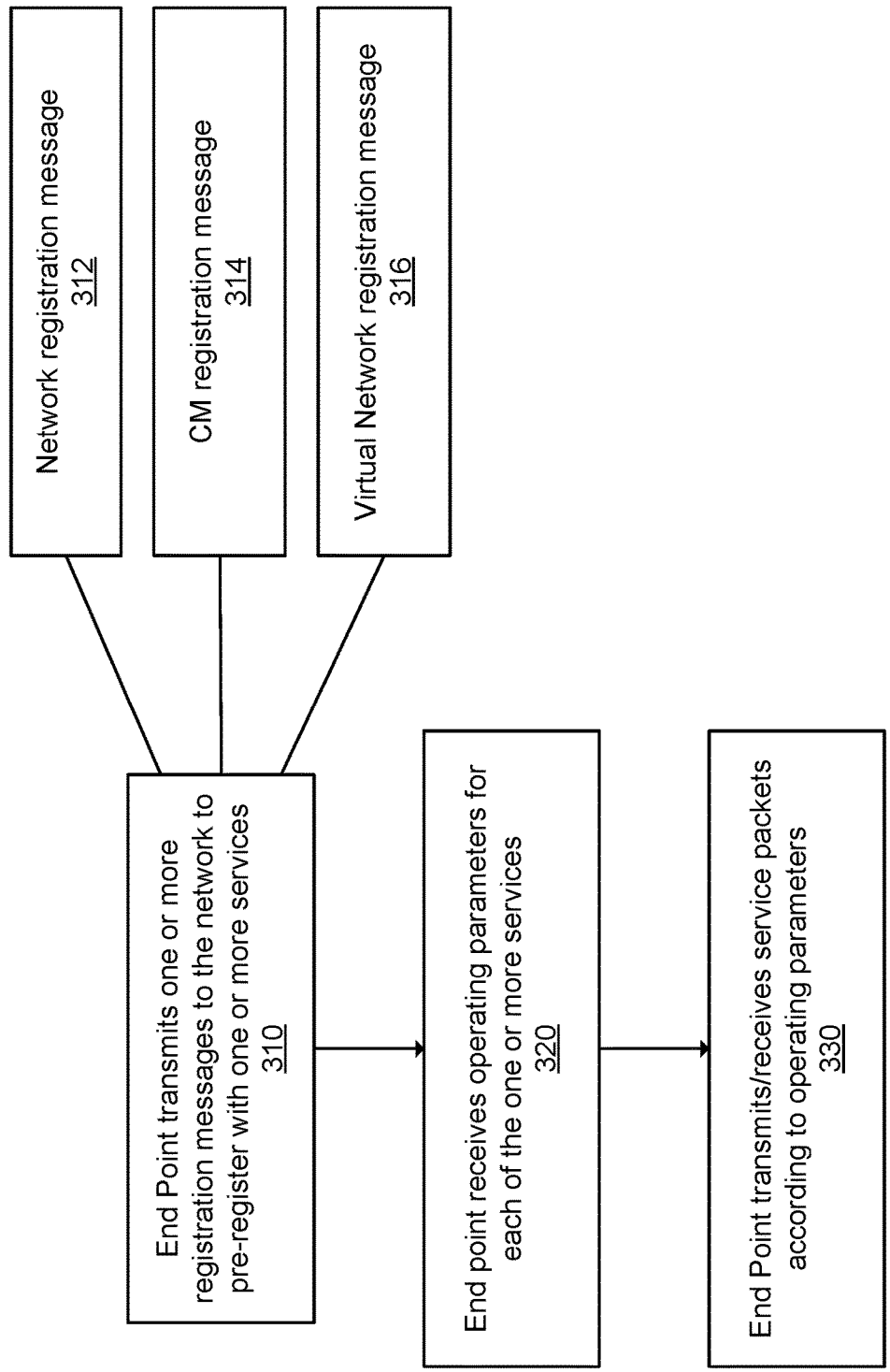
FIG. 3 illustrates operation of an end point such as a UE or server, according to embodiments of the present invention.

FIG. 3 illustrates operation of an end point, such as a mobile UE, a non-mobile UE, or a server, according to an embodiment of the present invention. The end point transmits 310 one or more registration messages to the network in order to pre-register the end point with one or more services or one or more VNs supporting such services. The registration messages may include a network registration message 312 for registering with the general network supporting the VN. The registration messages may include a CM registration message 314 for registering with a CM entity associated with the network and/or the VN. The CM entity may subsequently track the location of the end point. The registration messages may include at least one VN registration message 316 for registering the end point with the particular VN. The end point subsequently receives 320 operating parameters for use in accessing a service. The operating parameters may be received in a configuration message transmitted to the end point. One such operating parameter is a service ID which is associated with a given service. Other such operating parameters are dedicated access link resources to be used in association to the service. The end point subsequently transmits and/or receives 330 data packets associated with the service ("service packets") in accordance with the operating parameters, for example by including the service ID in transmitted packets which are to be associated with (e.g. handled by) the service. For example, packets transmitted by the end point, in accordance with the operating parameters, are received by an edge node and forwarded by the edge node for handling by a VN. The VN includes pre-established logical tunnels interconnecting nodes thereof and is configured to automatically handle the transmitted packets. The packets are handled according to the service, including routing the packets to a destination specified in the packets via pre-established logical tunnels of the VN.

Packets transmitted by the end point and received by the edge node may specify a name identifier which is separate from and independent of the destination's location. The name identifier is or refers to a substantially unique name or identification number of the destination device, which is tracked by entities operating in the network, such as CM and v-router entities. This location can refer to a location in the network topology and/or a geographic location. The v-routers (or SDT-Op) individually or collectively associate name identifiers with destination locations, and therefore operate to resolve a destination's location based on its identifier, and to route packets to the specified destination. For example, the first v-router to receive the packet may determine the location of the destination end point based on its name as specified in a packet. The first v-router may be associated with an edge node or at another network node. A v-router may interact with a connection manager, which tracks possibly mobile destinations, to perform this location resolution. As such, the end point is not required to indicate the location (e.g. IP address) of another end point for which a packet is intended. Rather, in various embodiments, only the name identifier, and other information such as a service-related identifier, is included in a packet submitted to the network by an end point.

Certain details related to embodiments of the present invention will now be described.

In various embodiments, when an end point, such as a UE or server, is to access a service, the end point registers to a VN supporting the service. The end point may register to the VN to indicate a requirement to access the service in future. The registration is typically separated in time from the actual access to the service. The registration may be performed via communication with one edge node, and access to the service may be performed via communication with a different edge node. Furthermore, once the registration is complete, access to the service may be made via multiple different edge nodes sequentially in time as the end point moves. Access to the service may be made concurrently via multiple access nodes of a RAN cluster which transmit or receive service-related packets using a spatial diversity, multiplexing or multicasting approach. The registration may be performed in a variety of ways.

In an implementation, registration may generally be performed by transmitting a registration message from the end point (i.e. a UE) to a network registration entity (e.g. an authentication, authorization and accounting (AAA) server), indicating an identity of the end point and the desired service or VN. The network registration entity may respond by storing the identity of the end point and providing operating parameters to the end point for use in accessing the service. The end point also registers to the network and to a connectivity management (CM) entity at, around or prior to this time. Registration to the CM entity initiates location tracking of the end point by the CM entity, if the end point is mobile. For non-mobile end points, the CM entity may register the fixed location of the end point.

The operating parameters may include a service-related identifier to be included by the end point in packets transmitted thereby, access link resources to use in transmitting packets to edge nodes, access link resources to use for receiving packets from edge nodes, or a combination of the above. The service-related identifier is used to specify packets which are to be treated by the VN and service. When a VN supports a single service, the service-related identifier may be a VN ID. When a VN supports multiple services, the service-related identifier may be the VN ID in combination with a service ID. The service-related identifier may additionally or alternatively include a network slice ID. The service ID or VN ID may be provided to the end point in a pre-configuration operation, or broadcast, along with a description of the associated service for receipt by end points, which self-configure as required. The operating parameters may include a radio ID for use in access link resource assignment. The radio ID may be similar, and may be used similarly, to a MAC ID as provided in 3G or 4G wireless networks. The binding between the radio ID, and the device ID and/or service ID can be established by the participating access node or RAN cluster.

The operating parameters, such as the service-related identifier, can be pre-assigned by SONAC-Com via out-of-band signaling. For example, a set of customer devices, such as wireless smart-reader devices, can be pre-configured to include a service ID which is pre-assigned to the customer. This pre-configuration can be performed during device set-up, prior to or during activation of the devices and/or prior to registration of the devices with the network.

The operating parameters, such as the service-related identifier can be assigned and communicated to a device by SDT-Op via wireless communication, upon registration of the device to the network. The device name and/or service (or slice) ID binding can be pre-configured.

In some embodiments, during registration, access link resources such as time, frequency and/or spreading code resources may be specified to the end point for use in accessing a service. The access link resources may be dedicated to an end point or to a service, or group of end points or services. In other embodiments, end points request access to a specified service over a general channel used for that purpose, and edge nodes (or schedulers) respond by indicating the appropriate access link resources to use during the access request phase.

Uplink access link resources may be shared among devices of a given network slice supporting a service. Downlink access link resources may include shared multicast resources which are shared among devices of a given network slice supporting a service. Packets may be delivered over a pre-configured virtual network/network slice which supports the service.

Upon registration, an end point may be associated with a VN Node. When an end point is associated with a VN Node, this VN node becomes an anchor point for the end point. Packets destined for the end point may be routed to the anchor point via the VN tunnels and then transmitted from the anchor point to the end point. The anchor point may change due to end point mobility. The CM entity may cause the anchor point to change in response to mobility and may cause v-router routing tables to update accordingly. The association of an end point to a VN Node may be determined based on the end point's MAC state, mobility velocity, and other network requirements. This association between an end point and a VN node can be viewed as logical tunnel between the end point and the VN Node. The anchor point may be an access node or a RAN cluster node which interoperates with multiple access nodes.

Figure 4A:
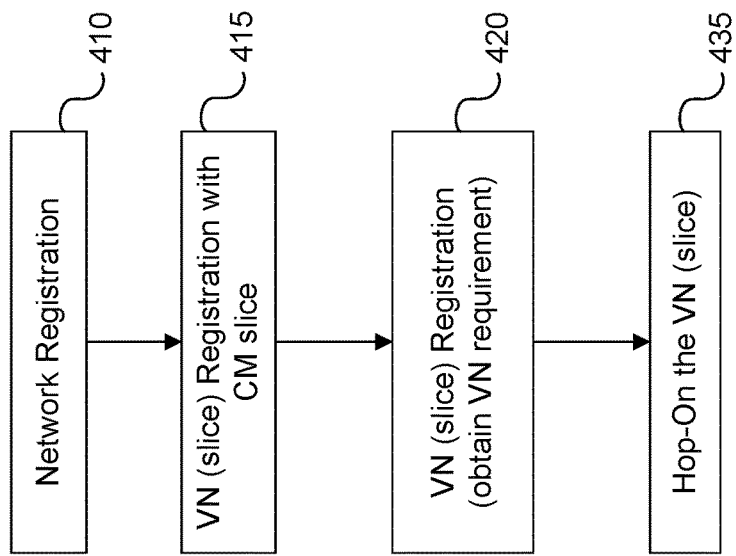
FIGS. 4A to 4C illustrate network registration and usage operations, with and without admission control, according to various embodiments of the present invention.

FIG. 4A illustrates a procedure followed when an end point requests access to a service supported by the VN. Network registration 410 is performed in which the end point obtains authentication and authorization to connect to the network. The network performs the authentication and authorization operation and provides the end point (and, in some embodiments, the edge node) with an indication of whether the edge node is authorized to connect to the network. Next, registration to a connectivity management entity (CM) 415 is performed, in which reachability operation is initiated by the CM. The reachability operation includes tracking, by the network, the location of the end point. Tracking may be initiated even before registering with a VN. Next, the network registers 420 the end point to a VN. VN requirements may be obtained at this point. In particular, a determination can be made, by the edge node, as to whether admission control (AC) is required for accessing the VN. This may be indicated by a configuration message transmitted from the edge node, for example. At this point, if no AC is required, the end point can begin transmitting data (or otherwise accessing the service), thereby "hopping on" 435 to the VN, that is, transmitting packets to an edge node which are appropriately marked for handling by the VN and/or service thereof.

Figure 4B:
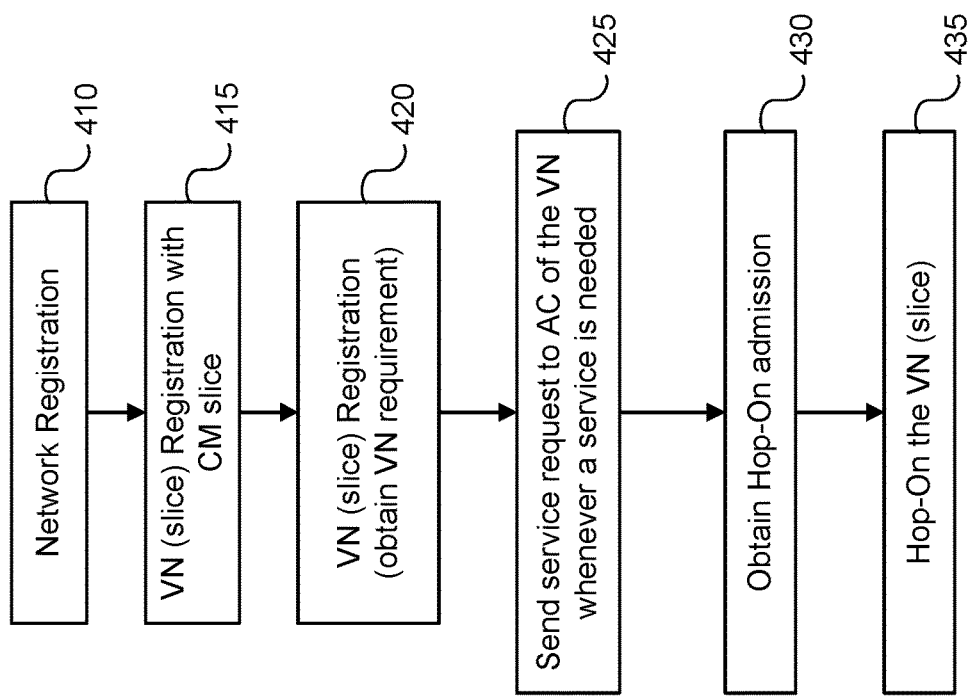

FIG. 4B illustrates an alternate aspect in which AC is required to access the service. and an AC procedure is performed. Operations 410, 415, 420 are as described with respect to FIG. 4A. When an end point requires use of the service (e.g. to download a file with a given data rate), a service request is transmitted 425 to an admission control entity, and a hop-on admission is obtained 430, for example in the form of an authorization message. The end point may then begin transmitting data or otherwise accessing the service, thereby hopping on the VN 435.

Figure 4C:
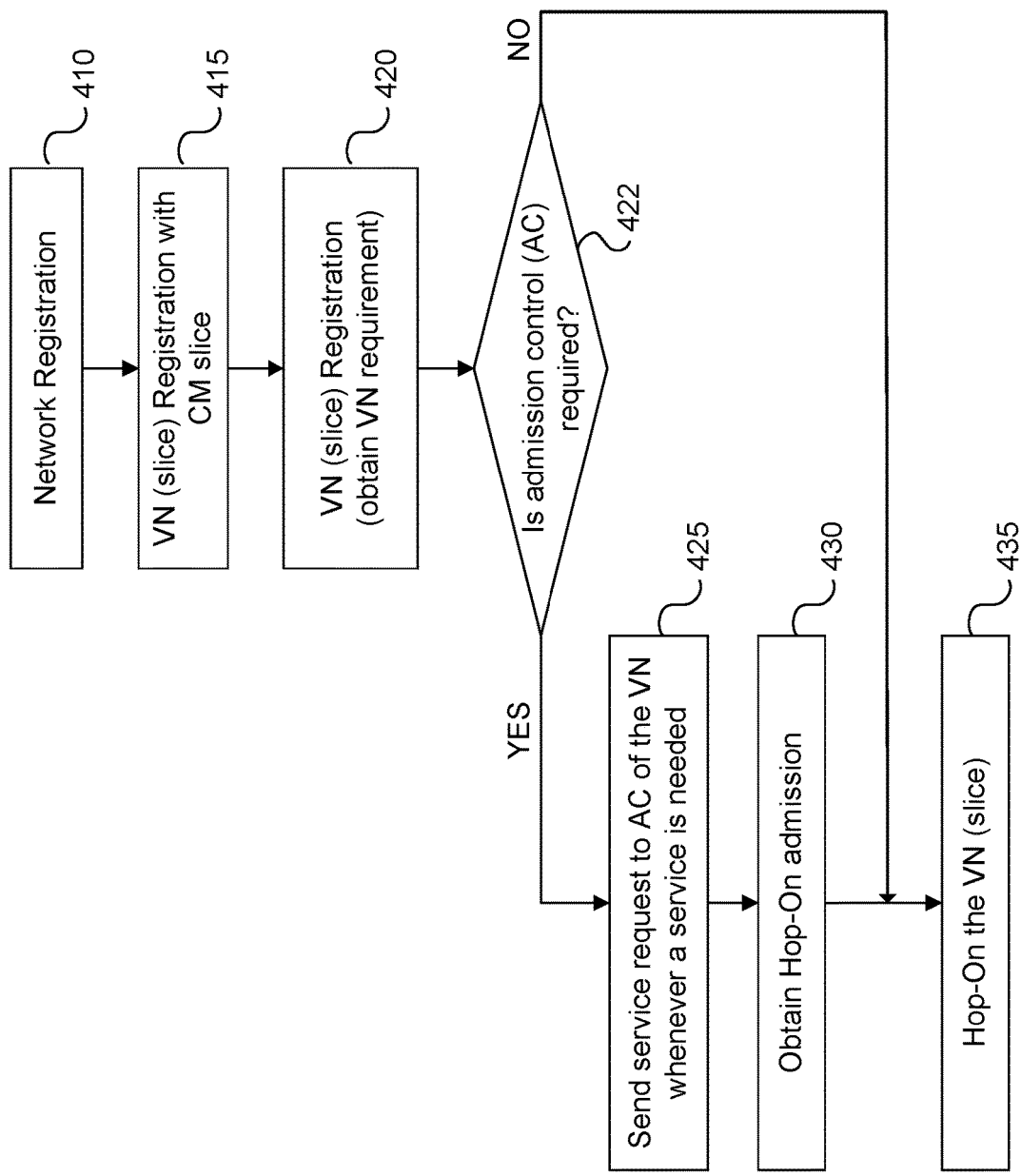

FIG. 4C illustrates an alternate embodiment in which selective AC may be applied by the edge node. In FIG. 4C, a determinative step 422 is conducted in addition to the operations described in FIGS. 4A and 4B. The determinative step 422 determines whether AC is required for the requesting end point. In the case that AC is required for the requesting end point, the edge node can direct the end point to follow the procedure of FIG. 4B. In the case that AC is not required for the requesting end point, the edge node can direct the end point to follow the procedure of FIG. 4A.

For hopping on a VN, after registration the end point simply sends a data packet which carries the name or ID of the destination and an identifier (such as a VN ID or service ID, or an identifier which is implicit in the access link resources used). Based on the identifier, the network will forward the data tunnel by tunnel over a VN until the data packet reaches the destination. The v-routers associated with VN Nodes determine the next tunnel ID (or next VN node ID) after a data packet is received and processed in a VN Node. This process uses end-point routing tables at each VN router. For fixed end-points, the routing tables can be set after end-point initial location registration. For mobile devices, v-routers acquire current location information from CM entities. Based on the destination name (or ID) and the acquired location information, a VN router will route the data packet to the appropriate next tunnel.

As noted above, end points can register with a CM entity which operates on the network to track the (mobile) end point's location over time. Location tracking begins at end point registration. As the end point moves through the topology of the networks, its location can be tracked by the CM. This can be achieved in a number of different ways known in the art including having the end point provide location update messages to the CM, either periodically or when a sufficient movement with respect to the topology has occurred. In other embodiments, the nodes connecting to the end points can communicate changes in reachability to the CM, allowing the CM to track where in the topology of the network the end point is connected. The VN is configured to route packets to the end point based on the tracked location of the end point. Location tracking can be performed in a variety of ways, for example by monitoring registrations or location update messages by the end point in different tracking areas, and/or monitoring the locations of edge nodes which are currently or recently in contact with the end point.

The CM may be configured to track the location of mobile end points and provide location information to v-routers. The CM can be provided as a tree hierarchy of local to more global CMs, which cooperate to provide location updates. When a lower-level CM lacks current location information, it may query a higher-level CM. When a higher-level CM registers a location update, it may pass the update to lower-level CMs.

In some embodiments, the CM pushes location updates to the v-router routing tables as they are received or on a schedule. The v-router routing tables use the currently available information regarding end point locations to configure how to route packets thereto. In some embodiments, the v-routers request a current location of the end point from the CM periodically or on an as-needed basis, for example when a v-router receives a packet destined for the end point or when it is determined that the last known location of the end point is incorrect.

As stated above, embodiments of the present invention include operating one or more edge nodes of the communication network to monitor for packets associated with a service, and to submit such packets to a service-oriented VN for handling thereby. The configuration may include, for example, configuring a function which associates with an edge node and which monitors headers and/or payloads of packets received by the edge node from end points. The function may be implemented at the edge node or remotely from the edge node, for example using cloud-based or datacenter resources and network function virtualization. Configuration of the edge node may be performed by configuring a VN node which is associated with (e.g. logically co-located with) the edge node.

In some embodiments, edge nodes are provided with one or more service IDs, VN IDs, radio IDs or other identifiers and configured to monitor packets for occurrence of such identifiers. An identifier being monitored for is associated with a service supported by the VN. Each edge node may also be configured to submit such packets to a designated VN node (of a VN supporting the service). The VN node may be associated with the edge node or communicatively linked to the edge node, for example via an open tunnel. Edge nodes may be provided with identifiers of UEs which have registered to use and/or which are pre-authorized to use specified services.

In some embodiments, edge nodes, such as wireless access nodes, are configured to use dedicated access link resources for transmitting and/or receiving packets corresponding to the service. Access link resources may include time slots, frequency bands, and/or spreading codes used for wireless multi-access communication. Use of such dedicated access link resources may include one or more of: transmitting using the resources, monitoring for reception of packets transmitted using the resources, specifying in a transmission scheduling request that the resources are to be used, and scheduling transmission according to the resources. In other embodiments, edge nodes are configured to use shared access link resources for transmitting and/or receiving packets corresponding to the service. The configuration of edge nodes to use dedicated or shared access link resources may be performed by SDRA-Com.

In some embodiments, rather than or in addition to forwarding packets to the VN based on an identifier contained therein, an edge node may be configured to forward packets to the VN based at least in part on the access link resources used to transmit the packet to the edge node. For example, when an end point is configured to use certain dedicated access link resources for transmitting packets according to the service, the edge node may automatically determine that a packet belongs to the service when it is transmitted using such dedicated resources, and accordingly forward the packet toward the VN associated with the service.

Because the VN topology, the routing table and the mapping between logical tunnels to physical network resource have been pre-configured, little to no signaling is needed for data traffic delivery from one originating end point to a destination end point in most cases. Because of end point pre-registration, subsequent transmission and reception operations at the end point and edge node are simplified. The originating end point simply transmits a packet in such a manner that the packet is associated with the service (e.g. by including a VN ID or service ID), and may also include in the packet an identifier of the destination end point for which the packet is intended. The packet is transmitted to the VN via an edge node. The packet may be transmitted after performing admission control to obtain authorization to use the VN. For routing data traffic over the VN to destination end point, v-routers are used. The location of a mobile destination end point is tracked by a CM entity and the location information is made accessible to the v-routers. In some embodiments, the originating end point and/or the associated edge node do not need to know the location of the destination end points, only the name identifier of the end point which enables the v-routers to direct the packets to the intended destination. Data packets of end points travel across a VN along the route guided by v-routers, which may be a function of SDT-Op.

In various embodiments, data packet transmission from end points is achieved by transmitting the packets to the network using the pre-configured VN resource. In some embodiments, this procedure can be a completely signaling-free procedure or a lightweight signaling procedure, for example in which only access link signaling is required if the VN has no pre-assigned access link resource, or if the pre-assigned resource is not shared among end-points of the VN. As such, some or all signaling related to session establishment, re-establishment for a device (session), which is present in legacy systems such as 3G/4G networks, is omitted in embodiments of the present invention. Data packet transmission from end-points corresponds to sending data to a network using established VN resources.

Figure 5A:
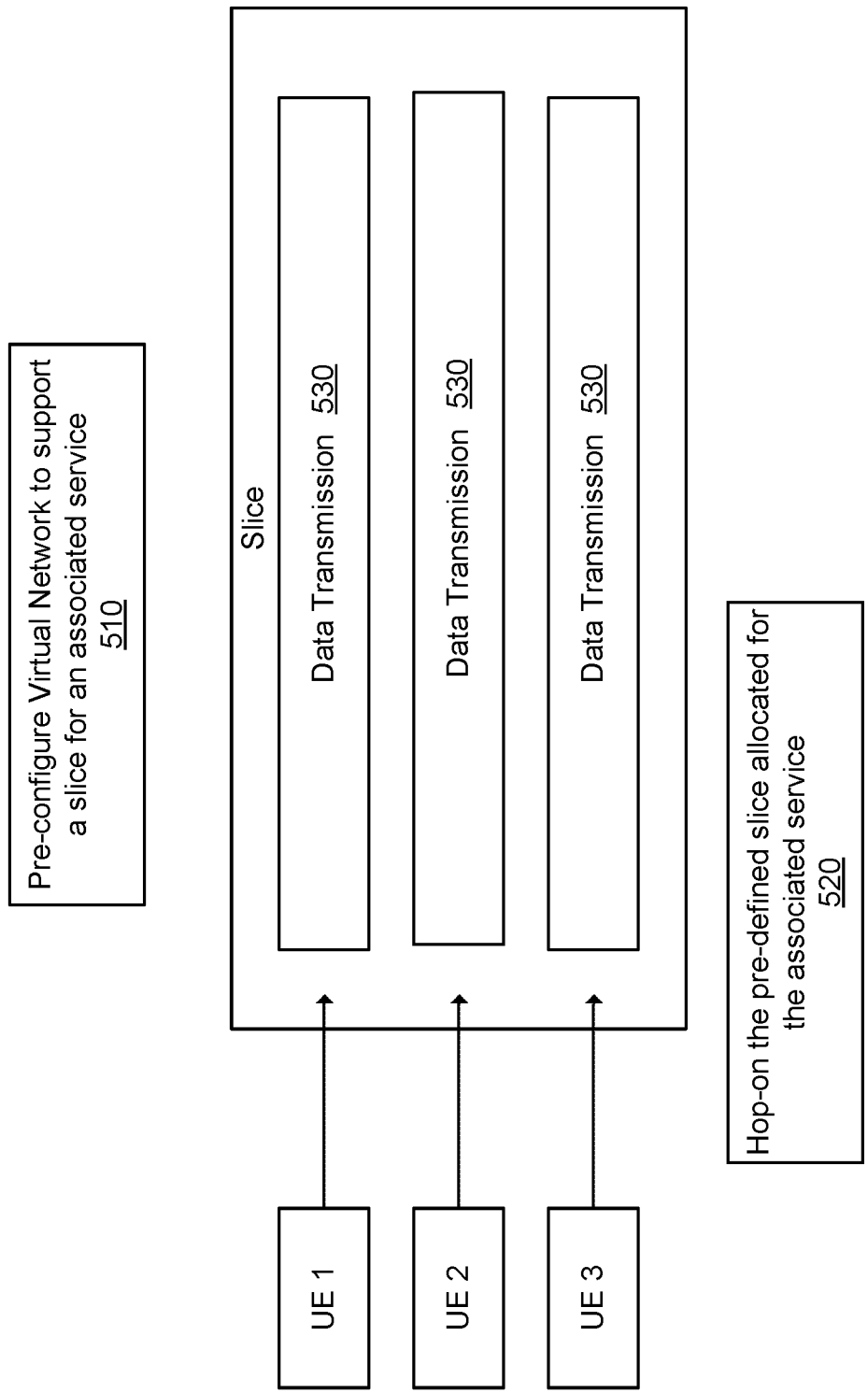
FIG. 5A illustrates network pre-configuration and usage operations, according to embodiments of the present invention.

As illustrated in FIG. 5A, embodiments of the present invention facilitate the ability for an end point to "hop-on" a pre-defined VN via a signaling-free procedure, or a procedure which requires only lightweight localised signaling. In particular, end points initiate 520 usage of the VN using the hop-on procedure described herein, and substantially immediately begin transmitting data 530. This results in short latency in comparison to the latency experience in conventional 3G/4G networks, which would require device session establishment following device initiation and prior to data transmission. Prior to the hop-on procedure, the VN is pre-configured 510 to provide a designated service to devices which share similar service and QoS requirements.

Embodiments of the present invention relate to the delivery of data packets from an edge node to a destination end point which is serviced by the edge node. The edge node receives, from the VN, a packet which specifies a name identifier and a service ID. The edge node then determines specific location information for the end point, and associated parameters such as access link resources and a radio ID to use for communicating the packet to the end point and QoS parameters. Operation of the edge node (e.g. RAN cluster node or access node) may correspond to operation of a v-router associated with the edge node.

Some embodiments support delivery of a packet to an end point from a RAN cluster node to an end point in wireless communication therewith as follows. The RAN cluster node receives a packet from the egress of a logical tunnel of the VN, the packet specifying a name identifier as an indication of the intended destination of the packet. The RAN cluster node consults an end point routing table which associates name identifiers with current candidate access nodes usable to potentially reach end points having such IDs. The RAN cluster then delivers the packet to one, some or all of the candidate access nodes that are listed in the table as being associated with the name identifier. The candidate access nodes then wirelessly transmit the packet for reception by the intended end point.

Access nodes receive packets from the egress of a logical tunnel linking thereto, for example having its ingress at a RAN cluster node or other VN node. The access node reads the packet header and identifies the intended destination end point. The access node then determines the radio ID of this end point, if any. The access node then determines the VN, network slice and/or service level QoS parameters and/or per-device QoS parameters, and determines an access link resource assignment to use for transmitting the packet to the end point. The access link resource assignment may be taken from a pre-assigned resource pool associated with the VN and/or network slice, for example.

Embodiments of the present invention relate to the delivery of data packets from a source end point to an edge node which services the end point. The edge node receives, from the end point, a packet which specifies another name identifier and/or service ID. The packet may have been transmitted using pre-assigned and/or shared access link resources, for example, or established network resources in the case of a server-to-gateway interaction. The edge node then submits the packet to an appropriate VN node for handling, or operates itself as such a VN node. The edge node may select a logical tunnel of the VN or a VN node based on contents of the packet, such as the destination name identifier and/or service ID, and submit the packet to same. Operation of the edge node in this embodiment may correspond to operation of a v-router associated with the edge node.

Some embodiments support delivery of a packet from an end point, such as a UE, to an access node. The end point creates the packet and includes in the packet at least one of: the destination name identifier along with the VN, slice and/or service ID, or only the radio ID using the pre-configured per-VN or per-slice resource. The Radio ID may be an identifier of one of the destination device, the source device, or the identifier of the radio bearer on which the transmission is to be transmitted. One or more access nodes communicatively coupled to the UE receive the packet and submit the packet to the ingress of a logical tunnel of the VN/slice which is accessible to the access node. The logical tunnel may be selected based on the packet header using VN routing tables. The packet may be transmitted using pre-configured dedicated access link resources, or without use of pre-configured, dedicated access link resources.

In some embodiments, the location of an end point is tracked by the CM and made accessible to v-routers. As such, end points from which data packets originate need not know the location of the end points for which the data packets are intended. Data packets of end points traverse the VN along a route which is controlled by the v-routers, which may be functionalities of SDT-Op.

For transmission of packets both to and from end points, access link resource assignment may be performed using appropriate resource assignment signalling messages. This may include radio bearer setup in the case of wireless transmission.

Figure 5B:
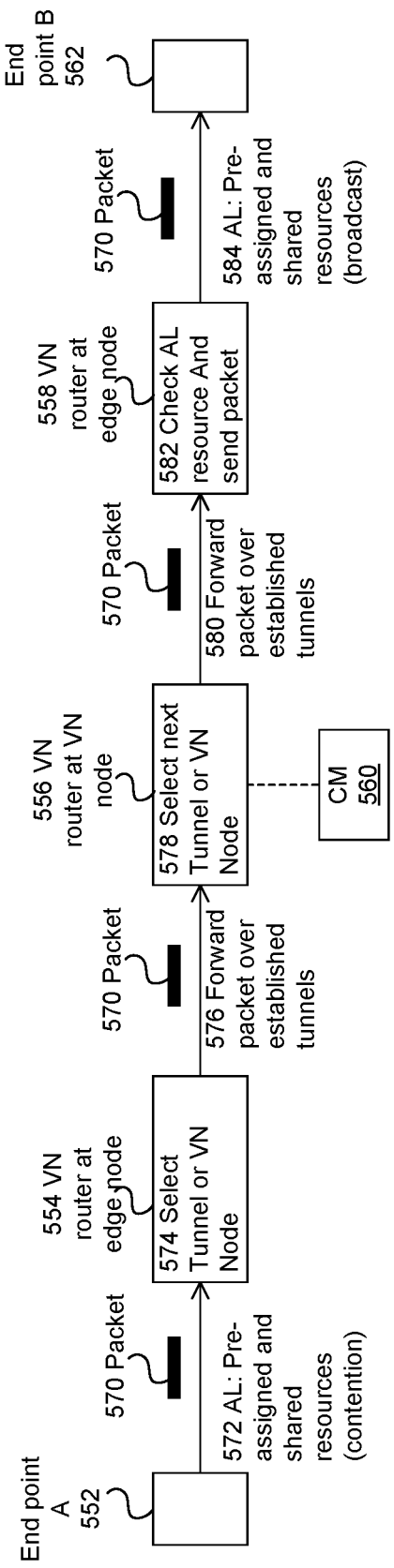
FIG. 5B illustrates an example of end-to-end packet routing for end points, according to an embodiment of the present invention.

FIG. 5B illustrates an example of end-to-end packet routing for mobile end points, according to an embodiment of the present invention. The routing includes operation of edge nodes to discriminate and forward packets to appropriate destination end points or v-routers, based on packet information such as the VN ID, service ID, and name identifier.

In more detail, end point A 552 is to transmit a packet to end point B 562. Both end points 552 and 562 are assumed to have registered to an associated service and with the CM 560. The end point transmits a packet 570 using certain access link resources 572, which may in some embodiments be pre-assigned and/or shared resources. Shared resources may be accessed on a contention basis. A v-router 554 associated with the edge node which receives the packet 570 processes the packet and selects 574 a next tunnel or VN node to which to submit the packet. The selection may be made on the basis of the routing tables of the v-router 554. The v-router forwards 576 the packet over established logical tunnels of the VN. A v-router 556 at another VN node receives the packet and operates to select a next tunnel or VN node to which to submit the packet. The selection may be based on end point information supplied by a CM entity 560 in response to a request or in push mode. The v-router 556 selects 578 a next tunnel or VN node to which to submit the packet. The v-router forwards 580 the packet over established logical tunnels of the VN. A v-router 558 at an edge node in communication with end point B 562 receives the packet, checks 582 the access link resource assignment to use for communicating with end point B 562, and transmits the packet toward end point B. The edge node 582 transmits the packet 570 for receipt by end point B 562 using certain access link resources 584, which may in some embodiments be pre-assigned and/or shared resources.

One of end points 552 and 562 may be a server, in which case the transmission of the packet over an access link can be replaced with the transmission of a packet over established links or tunnels between the edge node and the server.

As such, signaling related to session establishment, re-establishment for a device (session) in 4G systems is omitted in embodiments of the present invention. Data packet transmission from end-points corresponds to sending data to a network using established VN resources. In some embodiments, this procedure can be a signaling-free procedure or a lightweight signaling procedure, for example in which only access link signaling is needed if there is no pre-assigned access link resource to a VN, or if the pre-assigned resource is not shared among end-points of the VN.

Embodiments of the present invention comprise performing admission control prior to allowing an end point to transmit and receive data packets of the service via the VN, for example as shown in FIG. 4B. Admission control may be performed by the edge nodes and/or other entities such as CM entities, admission controllers, and/or other functions which may be part of the VN or outside but related to the VN. Admission control may be used on a case-by-case basis, and may be omitted in some embodiments, for example as shown in FIG. 4A. According to admission control, when an end point requires use of a service (e.g. to download or stream data, or to begin a communication session with another end point), an admission control procedure is performed in an attempt to obtain authorization for the end point to use the service. Admission control may be used for example when authentication of end points is required, or when delivery of the service requires significant resource usage, and a determination of whether sufficient resources are available is to be made prior to service delivery. Admission control may be required, for example, when the service involves bulk data transmission over a VN with limited capacity.

Figure 6A:
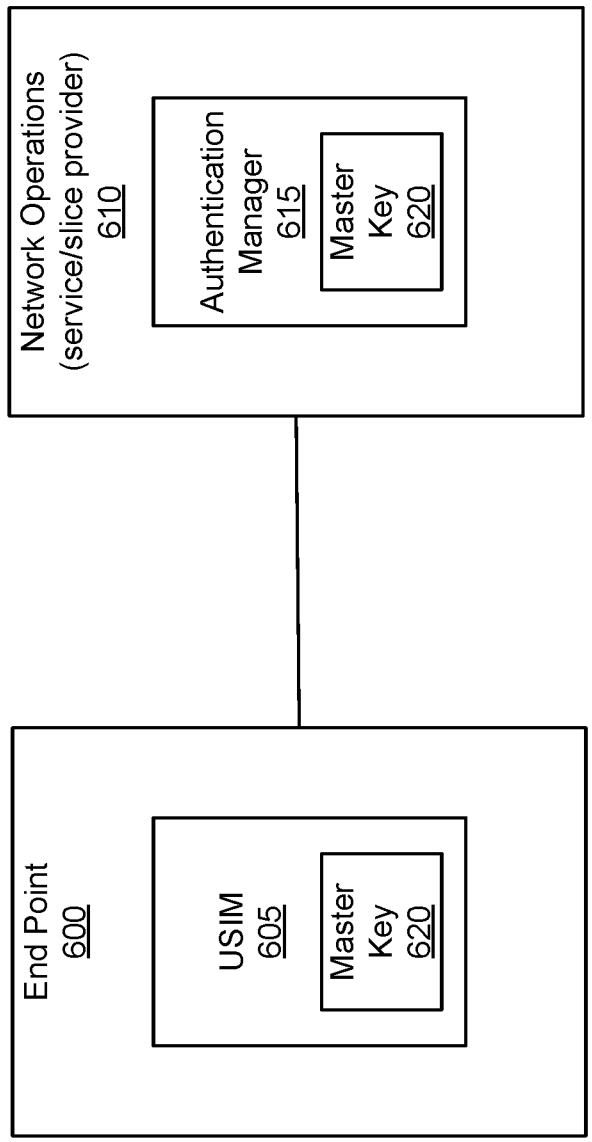
FIG. 6A illustrates master security key location in accordance with an embodiment of the present invention.

Embodiments of the present invention provide for security measures for authenticating devices using the VN and service supported thereby, for example in association with admission control. As illustrated in FIG. 6A, a master key 620 is maintained by both an end point 600 and an authentication manager 615 of a network operations entity 610. At the end point 600, the master key 620 may be stored in a secure module such as a USIM 605. For authentication purposes, a set of keys and checksums are generated at an authentication center, such as by the authentication manager. The keys and checksums may be generated as a function of the master key, the function incorporating a random element. The set of keys and checksum are then transferred (along with an indication of the random element) to the end point. The end point then calculates the same set of keys using the same function and random element, based on its own copy of the master key. Authentication is then completed based on the above.

In various embodiments, derivation of key material proceeds as follows. A network AAA, or service (or slice) AAA, such as a customer service management AAA function (CSM-AAA) derives key material Kservice as a function of a service-related identifier, such as a service ID, slice ID of a slice supporting the service, and/or VN ID of a VN supporting the service. If the key materials are generated by the network AAA, they are then sent to the service (or VN or slice) AAA. The service AAA then distributes the key materials to service (or VN or slice) security functions which are located in some VN nodes. Next, after an end point is admitted to a service (and/or VN and/or slice), both the end point and the service security functions may use key derived keys to cipher and de-cipher data packets and/or to check integrity of signaling messages. The key derived keys may be derived for example via functions of: a device (end point) ID, a service or slice ID, a VN ID, a current absolute time, an ID of a current security function, a current nodeB (e.g. gNB) ID, and/or an ID of radio bearer being used.

It is noted that key materials can be forwarded by the service AAA to a security function in a target VN node, for example during a handover operation related to an end point.

Figure 6B:
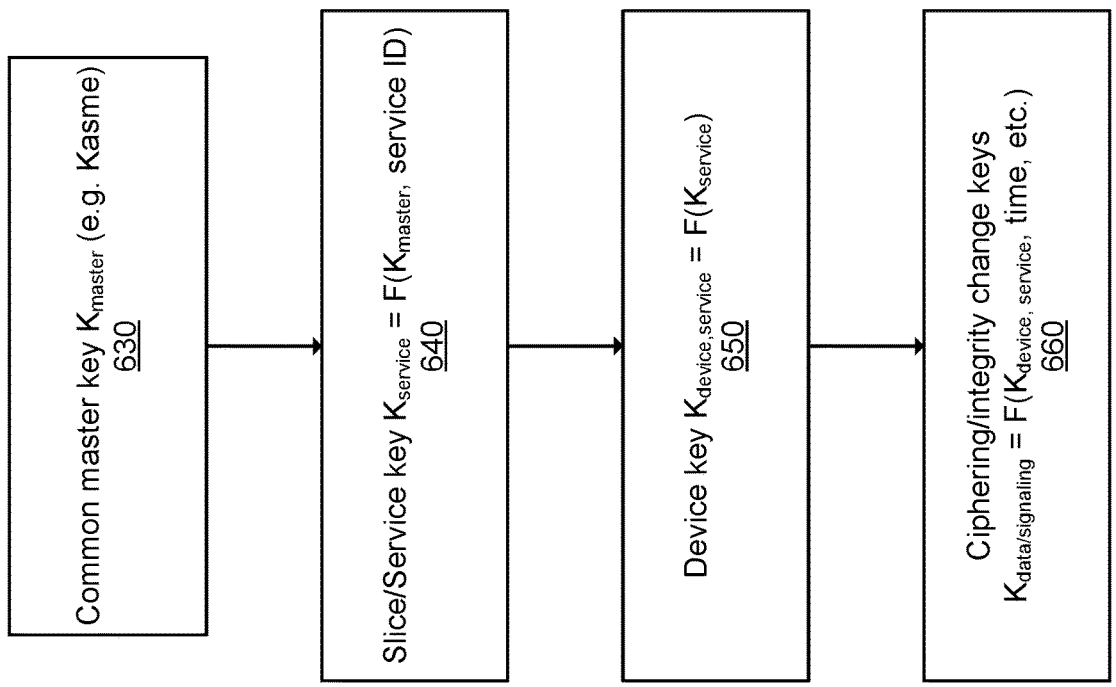
FIG. 6B illustrates security key material derivation in accordance with an embodiment of the present invention.

FIG. 6B illustrates a key material derivation procedure according to an embodiment of the present invention. A common secret master key, such as the Kasme key used in the Long-Term Evolution (LTE) wireless networking standard, is provided 630. The common secret master key is associated with key materials used during network authentication and/or authorization. Next, a service (or VN or slice) key Kservice relevant to the current service (VN/slice) is provided 640 as a function of the master key and a service (VN/slice) ID. This key is associated with key materials used during service (VN/slice) deployment, and such key materials are service (VN/slice) dependent. The service (VN/slice) key may be managed by a service (VN/slice) AAA or network AAA entity. Next, device (end point) key materials Kdevice,service are provided 650 as a function of the service (VN/slice) key Kservice. The device key materials are created after a device is allowed to hop-on a slice. The key materials may be created by the service (VN/slice) AAA (CSM-AAA), which may derive the key materials and distribute them to security functions of the service (VN/slice). Next, ciphering/integrity change keys Kdata/signaling are provided 660, for example as a function of the device key materials and other parameters such as current time. The ciphering/integrity change keys may be used for real-time traffic data and signaling, and may be created at data transmission time by security functions, such as but not limited to packet data convergence protocol (PDCP) functions.

Embodiments of the present invention provide for an end point registration procedure. Network and VN registration may be per-device (end point) based or per-customer based. The per-customer based procedure can be used to request VN/service/slice access for all devices of a customer.

Examples of device registration procedures are presented in FIGS. 7A, 7B, 7C, and 7D. Before an end point such as a UE connects to the VN, the end point transmits a service request to an admission control entity supervising the virtual network. The admission control entity determines whether to allow the end point to use the service and, if so, transmits an authorization to the end point. The authorization may further be provided (by either the admission control entity or the end point) to an edge node, VN node or v-router to inform same of the authorization. In some embodiments, the edge node transmits the service request on behalf of the end point, and receives the authorization to determine whether to grant the end point access to the VN. The admission control entity, edge node, VN node and/or v-router are configured to carry out this admission control procedure. The admission control entity may be instantiated using data center or cloud resources as part of the pre-configuration, and may be associated with one or multiple edge nodes, for example.

Figure 7A:
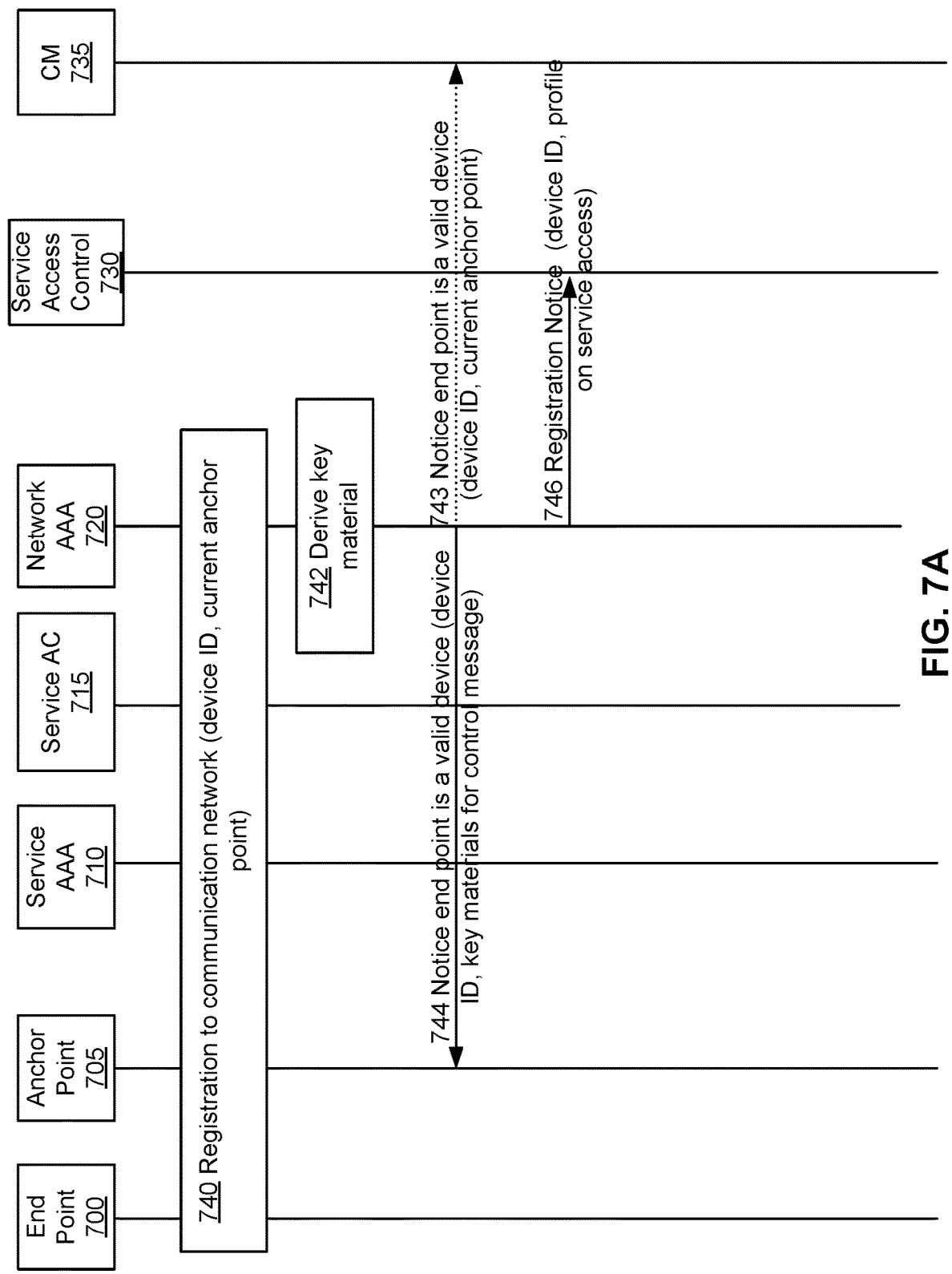
FIG. 7A illustrates a per-device registration procedure in accordance with an embodiment of the present invention.

Having reference to FIG. 7A, which illustrates part of a per-device registration procedure, an end point 700 registers 740 to the network. The network registration procedure 740 may for example be similar to a network registration procedure in a legacy 3G/4G wireless communication network. The end point 700 is then authenticated and authorized to use the network. Next, the network AAA 720 derives 742 the key materials for all control signaling messages. Optionally, the network AAA 720 notifies 743 a CM entity 735 (e.g. a global CM) that the end point is a valid device (e.g. is authorized and authenticated). The CM 735 may add the authorization and authentication to the location record corresponding to the end point 700. The end point's device ID and current location/anchor point may be specified in the notice. The network AAA 720 also notifies 744 to an anchor point 705 (or edge node) of the end point 700 to indicate that the end point is a valid device. The notification 744 also includes the key materials to be used for all signal ciphering/integrity checks to the security function at the current anchor point of the VN (or slice) for this end point. The anchor point may be at a nodeB, such as a gNB, for example. The network AAA 720 also sends a registration notification 746 to the service access controller 730 including information of the end point's device ID, and profile on service/VN/slice usage restriction, etc. At this point, the end point is registered with the CM and service access controller.

Figure 7B:
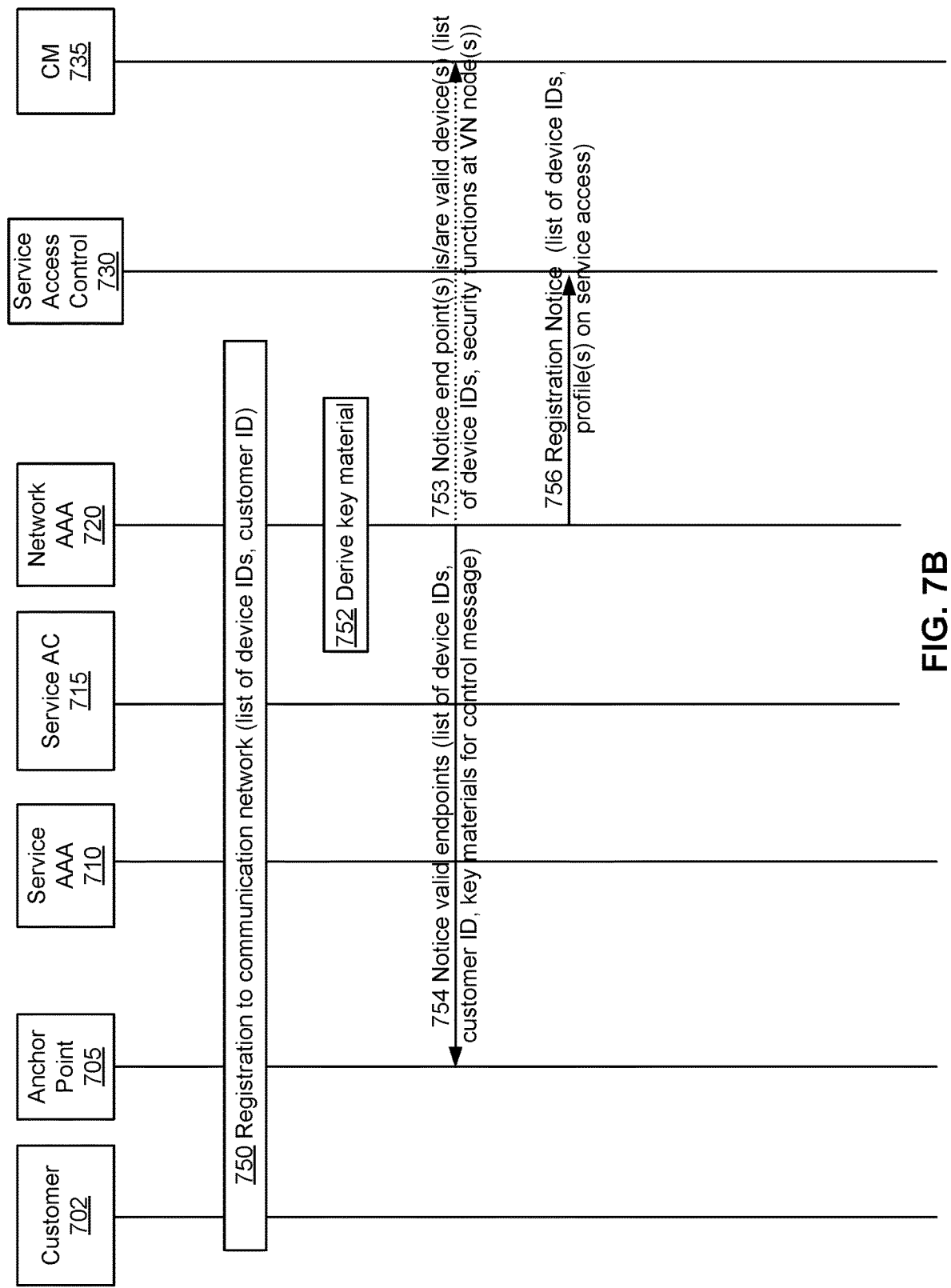
FIG. 7B illustrates a per-customer registration procedure in accordance with an embodiment of the present invention.

FIG. 7B illustrates part of a per-customer based registration procedure that allows a customer (i.e. a customer of the network operator) to register multiple devices associated with that customer. The customer may be a business or government organization, for instance, that maintains a list of authorized users (devices) that are authorized to access a service provided by that customer. The devices may be owned by the customer, or may be owned by the users. The customer may update the list as required, to provide authentication and authorization at the edge of the VN. In another aspect, the customer may be the owner of one or more end points which are registered with the network operator. The customer may seek to authorize and authenticate all of its devices in a single registration operation. Referring to FIG. 7B, the customer 702 (i.e. a device representing the customer) registers 750 with the network the devices (users) who are authorized to access the service(s) associated with the customer. The customer ID and a list of authorized devices can be specified during the registration. The registration procedure may for example be similar to a legacy 3G/4G network registration procedure. The customer, and the devices thereof, are then authenticated and authorized to use the network. Next, the network AAA 720 derives 752 the key materials for all control signaling messages for the devices being registered by the customer. The key materials may be a function of the customer ID, device IDs, etc.

Optionally, the network AAA 720 sends a notification 753 to a CM entity 735 (e.g. a global CM) to indicate a list of customer devices which are valid devices. The valid device IDs and current location/anchor points may be specified in the notification. The CM entity 735 may update its records to include the authentication and authorization information in association with its end point location information. The network AAA 720 also sends a notification 754 to an anchor point 705 (or edge node) of the end point 700 to indicate a list of the customer devices which are valid devices. The notification 754 may be sent to multiple edge nodes/anchor points. The notification 754 also includes the key materials to be used for all signal ciphering/integrity checks to the security function at the security functions located at multiple VN nodes. The network AAA 720 also sends registration notification 756 to the slice access controller 730 including a list of device IDs and the customer ID, and a profile on slices usage restriction, etc. At this point, the customer's devices are registered with the CM and service access controller.

Figure 7C:
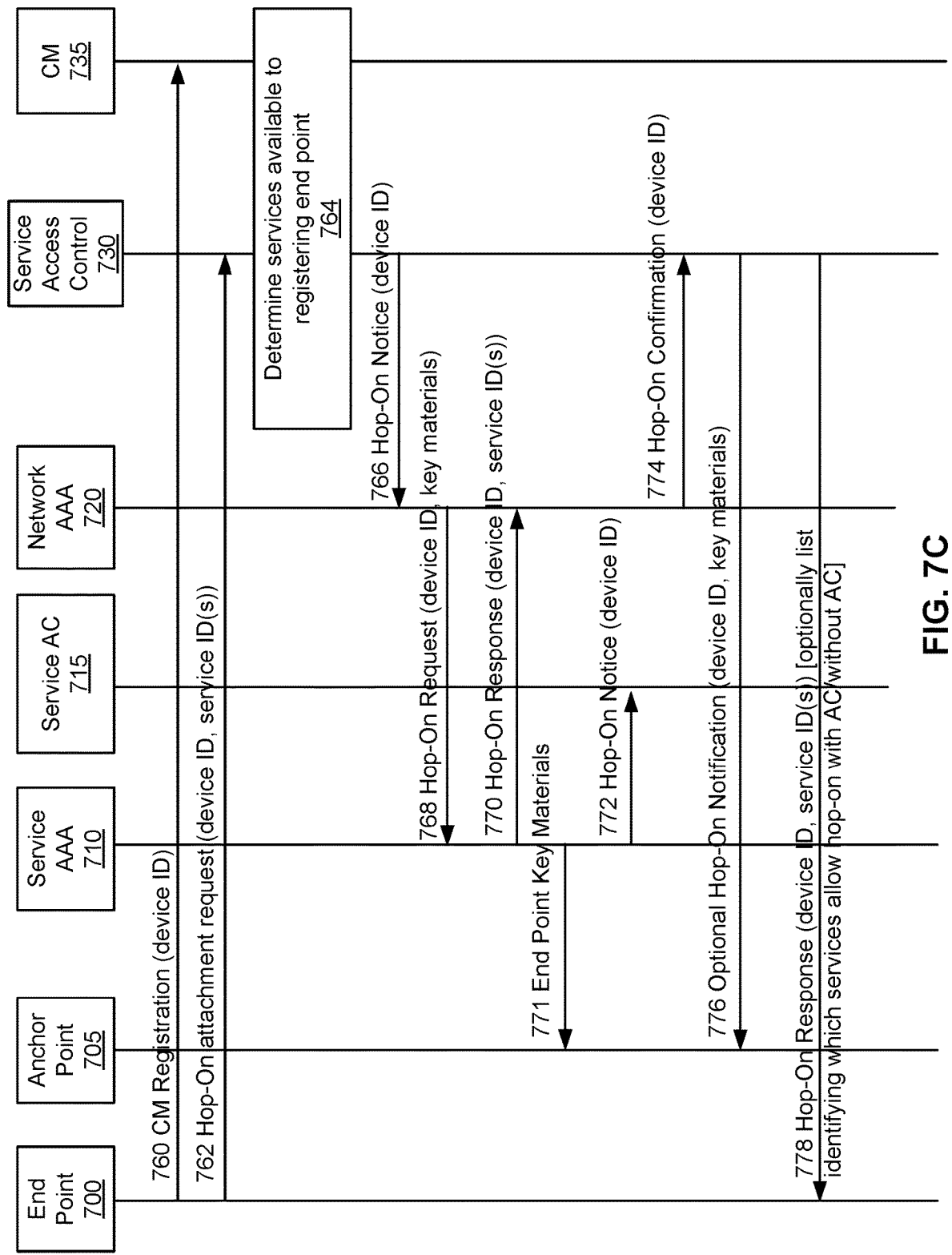
FIG. 7C illustrates further registration operations following the procedures of FIGS. 7A and 7B, in accordance with an embodiment of the present invention.

FIG. 7C illustrates operations which occur after the operations illustrated in FIGS. 7A and 7B. In the following, and in some embodiments, the end point 700 may be substituted with the customer device 702, in which case the operations can be carried out on a per-customer basis, by the customer device 702 on behalf of multiple end point devices. The end point 700 sends 760 a CM registration message to the CM 735, including the end point device ID and current location (or list of device IDs and current locations). The end point 700 sends a hop-on (or service access) attachment request 762 to the service access controller 730. The service access controller 730 determines 764 services available to the end point 700 (or customer devices) and determines services (VNs/slices) which the end point 700 is (or customer devices are) allowed to access via hop-on. The service access controller 730 informs 766 the network AAA entity 720 of the determined list of services (VNs/slices) which the end point is (or customer devices are) allowed to hop-on in a hop-on notice which designates the device ID(s) and a list of the allowed services/slices. The network AAA entity 720 calculates key material for each of the allowed services/slices and sends 768 a hop-on request to the service (or VN or per-slice) AAA 710. Alternatively, the service (or VN or per-slice) AAA 710 generates the key material. The key material may be a function of the slice ID, device ID, device key, etc. A hop-on response 770 is transmitted from the service (or VN or per-slice) AAA 710 to the network AAA entity 720. The service (or VN or per-slice) AAA 710 also sends 771 the key materials of the end point(s) to the service/VN/slice security function at the current anchor point(s) 705 of the end point(s) (e.g., at the anchor point, access node, gNB, etc.). The service (or VN or per-slice)

AAA 710 also sends notice 772 to the service admission controller (AC) 715 of services/VNs/slices which allow hop-on of the end point(s) but need admission control. The notice may include the device ID(s).

The network AAA 720 also sends 774 confirmation of the hop-on notice to the service access controller 730. The confirmation may include the device ID(s), and list of IDs of services (slices) which are authorized for use. Optionally, the service access control function 730 sends 776, in a hop-on notification, the key materials of the end point 700 to a security function at the current anchor point 705 of the end point 700 or to multiple security functions at multiple VN nodes. At this point, slice security functions at one or more VN nodes are equipped with required key materials of the end point. The service access control function 730 also sends 778 the hop-on response to end point 700 (or customer device 702), including the list of services/VNs/slices for which hop-on is allowed and an indication of which services/VNs/slices need further admission control. At this point of time, the end point 700 is (or customer devices are) ready to hop-on.

Figure 7D:
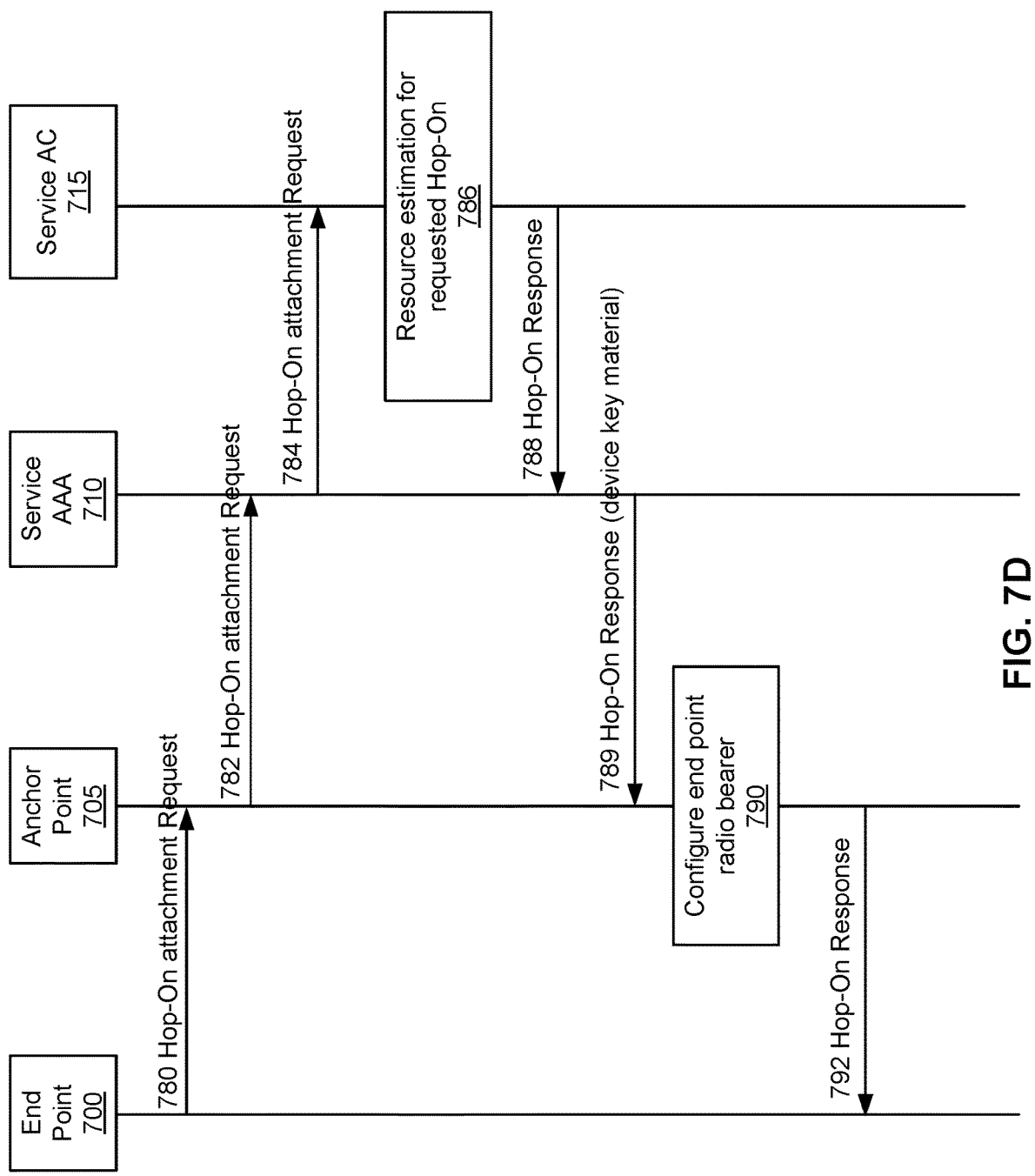
FIG. 7D illustrates an end point hop-on procedure with admission control, according to an embodiment of the present invention.

FIG. 7D illustrates an end point hop-on procedure with admission control, according to another embodiment of the present invention. Before starting hop-on, the end point sends a hop-on request to the network. A processing function of this signaling forwards the message to a per-service (or VN or slice) AAA, where the end point's security materials are available. The per-service AAA forwards the key material to a security function (data plane) of this service/VN/slice. The end point starts hop-on. At the session finish the device's keying materials are removed. The end point 700 transmits 780 a hop-on attachment request to its anchor point 705, or to an associated signaling process function or security function. The anchor point 705 forwards 782 the hop-on attachment request to the service AAA 710, which in turn forwards 784 the request to the service admission controller 715. The service admission controller 715 estimates 786 resources for accommodating the requested hop-on and provides an appropriate admission control decision in a hop-on response 788 to the service AAA 710. The service AAA 710 forwards 789 the response, including device keying material if applicable, to the anchor point 705. The anchor point 705 configures 790 the end point radio bearer and provides 792 the hop-on response to the end point 700.

According to embodiments of the present invention, end point (device) operational states can be dependent on device registration states. Table 1 shows multiple device registration states, the device being an end point potentially using the hop-on communication mode. Table 1 shows four different registration states in different respective rows, namely: registered or not registered with a given network; registered or not registered with a given slice, VN or service; authorized or not authorized to utilize the hop-on mode without requiring admission control; and authorized or not authorized to utilize the hop-on mode but subject to admission control. Table 1 shows two different operational states in the different columns, namely in the hop-on operational state ("Hop-on") or not in the hop-on operational state (blank). Based on the status of the registration states, the device is determined to be either in or not in the hop-on operational state. In the hop-on operational state, the device is registered to the network and a slice and authorized to utilize the hop-on mode (e.g. to transmit service-related packets via the VN), either unconditionally or subject to admission control. In particular, when the device is in the network registered state, and also in the slice/VN/service registered state, and also in one of the two states for which hop-on is authorized, then the device is determined to also be in the hop-on operational state.

TABLE 1

| Device Registration and Operational States | | | | | |
|---|---|---|---|---|---|
| Registration state | | | Hop-On | | Hop-On |
| Network registered | N | Y | Y | Y | Y |
| Slice registered | | N | Y | Y | Y |
| Hop-On allowed without AC | | | Y | N | |
| Hop-On allowed after AC | | | | | Y |

Further details of the end point hop-on operation will now be described. In some embodiments, when the device is in a hop-on operational state (i.e. registered to the network and the slice/VN/service, and allowed to use the hop-on mode with or without authorization), the device can be assigned a logical resource only or both a logical resource and a physical resource.

In some embodiments, when the device is in the hop-on operational state, the transmissions to the device (e.g. downlink transmissions) can be either paging-free or paging-before-transmission types of transmissions.

In some embodiments, paging-free transmissions may be performed without related signaling. For example, transmission points can directly transmit data to devices without any signaling (such as scheduling messages). Such data may be transmitted using a pre-assigned shared or dedicated resource. For paging-free, the location information at the transmission point level is known. However, the logical and/or physical access link resource may or may not be available.

In some embodiments, paging-free transmissions may be performed with limited related signaling. For example, transmission points can transmit resource assignment signaling and use the related assigned resources to transmit data to devices.

In some embodiments, for paging-before-transmission, data destined for a device (e.g. downlink data) may be sent to an anchor point associated with the device. Subsequently, the CM entity instructs one or multiple transmission points to page the device. After the device acknowledges the page, the CM entity informs SDT-Op to route data to one or more identified transmission points, such as a transmission point servicing a region associated with receipt of the paging response. The transmission point(s) then transmit data in the same manner as described above for the paging-free transmission case.

In some embodiments, when the device is in the hop-on operational state, the transmissions from the device (e.g. uplink transmissions) can be performed without related signaling or with limited related signaling.

For transmissions from the device performed without related signaling, the device may transmit data using a pre-defined transmission resource, such as a dedicated or shared resource. In some embodiments, the device then waits for an acknowledgement or negative acknowledgment and may re-transmit the packet as necessary.

For transmissions from the device performed with limited related signaling, the device may transmit a resource request using dedicated or shared resources. After receiving a resource assignment in response to the request, the device may transmit data using the assigned transmission resource, such as a dedicated or shared resource.

In some embodiments, an end point (device) using the hop-on mode can be associated with multiple states, including a packet data convergence protocol (PDCP) connected state, a radio link controller (RLC) connected state, and a physical over-the-air (OTA) resource connected state.

In the PDCP connected state, only PDCP (security) materials are kept by both the anchor point of the device and by the device. In the RLC connected state, both the PDCP and the RLC materials are kept, by both the anchor point and the device. In the physical OTA resource connected state, PDCP, RLC and physical OTA resources are assigned.

In some embodiments, an end point (device) using the hop-on mode can be tracked at different location tracking granularities. For example, one of the location tracking granularity levels may be selected for use in tracking the device at a given time. The level of the granularity can be determined by the CM entity/function based for example on device mobility attributes, and service quality requirement. A first location tracking granularity level is a paging-free level, in which the location is tracked at the cell or transmission point level. A second location tracking level is a paging-before-transmission level, in which the location is tracked at a non-cell or transmission point level and paging is required before data delivery to a hop-on device.

Table 2 illustrates aspects of the PDCP state, RLC state, and physical OTA resource state. The cumulative nature of the states is shown, namely in which the RLC connected state requires the PDCP connected state, and the physical OTA resource connected state requires both the RLC connected state and the PDCP connected state.

TABLE 2

PDCP, RLC state, and physical OTA resource states

| Resource state name | Resource | Physical OTA resource connected state | RLC connected state | PDCP (security) connected state |
|---|---|---|---|---|
| PDCP | Logical resource - security or PDCP (shared or per device) is kept | Y | Y | Y |
| RLC | Other logical resource is kept (RLC/MAC) (shared or per device) | Y | Y | N |
| Physical over-the-air (DL/UL dedicated resource) | Actively use physical OTA resource for the purpose of data transmission (Grant needed or grant-free) | Y | N | N |

Table 3 illustrates a relationship between the PDCP connected state, RLC connected state, and physical OTA resource connected states and the tracking granularity, according to an embodiment of the present invention. Namely, the paging-free tracking level can be implemented when only the PDCP connected state is established, in which case when data needs to be sent, lightweight signaling is required for setting up the RLC connection and OTA resource. The paging-free tracking level can alternatively be used when the PDCP connected state and the RLC connected state are established, in which case when data needs to be sent, lightweight signaling is required for assigning the OTA resource. The paging-free tracking level can alternatively be used when all three of the PDCP connected state, the RLC connected state, and the physical OTA connected state are established, in which case no signaling is required when data needs to be sent.

The paging-before-transmission tracking level requires knowledge of a device's location when data needs to be sent. As such, a paging procedure is triggered, for example by CM or SONAC-Op. Subsequently, the tracking level of a device becomes the paging-free tracking level. For the paging-before transmission tracking level, a device can be in the PDCP connected state only or in the PDCP connected state and the RLC connected state. When the RLC is in the connected state, it is implicitly assumed that the PDCP is connected. Similarly, when the Physical OTA is in a connected state, it is implicitly assumed that both the PDCP and the RLC are connected. It is noted that both the RLC function and the PDCP function are located at the anchor point function. For the paging-before-transmission tracking level, these functions may or may not be at a RAN transmission point.

TABLE 3

PDCP, RLC state, and physical OTA resource states vs. tracking granularity

| Location granularity (anchor point) | RAN transmission point (paging-free) | | | Not in RAN transmission point (paging before transmission) | |
|---|---|---|---|---|---|
| PDCP connected state | Y | Y | Y | Y | Y |
| RLC connected state | Y | Y | N | Y | N |
| Physical OTA connected state | Y | N | N | | |

A Data Radio Bearer (DRB) is a logical construct used to differentiate the different logical channels through which a basestation (e.g an eNodeB or a gNodeB) communicates with an electronic device (e.g. a mobile device such as an MTC device or a UE). The DRB has an associated a set of transmission parameters that may include a specification of waveform, parameters associated with the waveform, whether or not acknowledgements are required etc. It is possible for each access node (e.g gNodeB or eNodeB) to map traffic flows to different DRBs. This mapping can be done on at least one of a per flow and per slice basis (including a per flow per slice basis). The mapping can be created in accordance with the characteristics of the DRB (e.g. the characteristics resulting from the associated set of transmission parameters) and the requirements of the traffic flow (e.g. QoS requirements etc.)

From the view of the basestation in a downlink transmission environment, a DRB is uniquely associated with a UE (or other electronic device). There may be more than one DRB associated with the UE, but only one UE associated with each DRB. When the basestation has traffic to transmit to the UE, it can determine which DRBs are associated with the UE, and from the available DRBs select a DRB. This selection can be done in accordance with QoS requirement, and other connection type requirements.

From the view of the basestation in an uplink transmission environment, traffic received on a given DRB can be associated with the UE that is uniquely associated with the DRB. Traffic received over a DRB can be forwarded to a gateway associated with a virtual network (e.g. a virtual network within a network slice), based on a selection from the networks associated with the DRB. If the DRB is uniquely associated with a single network slice, then the forwarding can be done with limited delay due to decisions on where to forward the data.

In the context of a sliced network environment, the present invention provides a mechanism to allow the selection of a DRB in association with the network slice carrying the traffic for transmission. If a particular slice is associated with a URLLC service, a DRB can be pre-mapped to the slice so that the transmission needs of the slice are reflected in the characteristics of the DRB. Those skilled in the art will appreciate that traffic flows from a service within a URLLC slice can be mapped to a DRB that provides reliability in the transmissions to the UE.

Figure 8A:
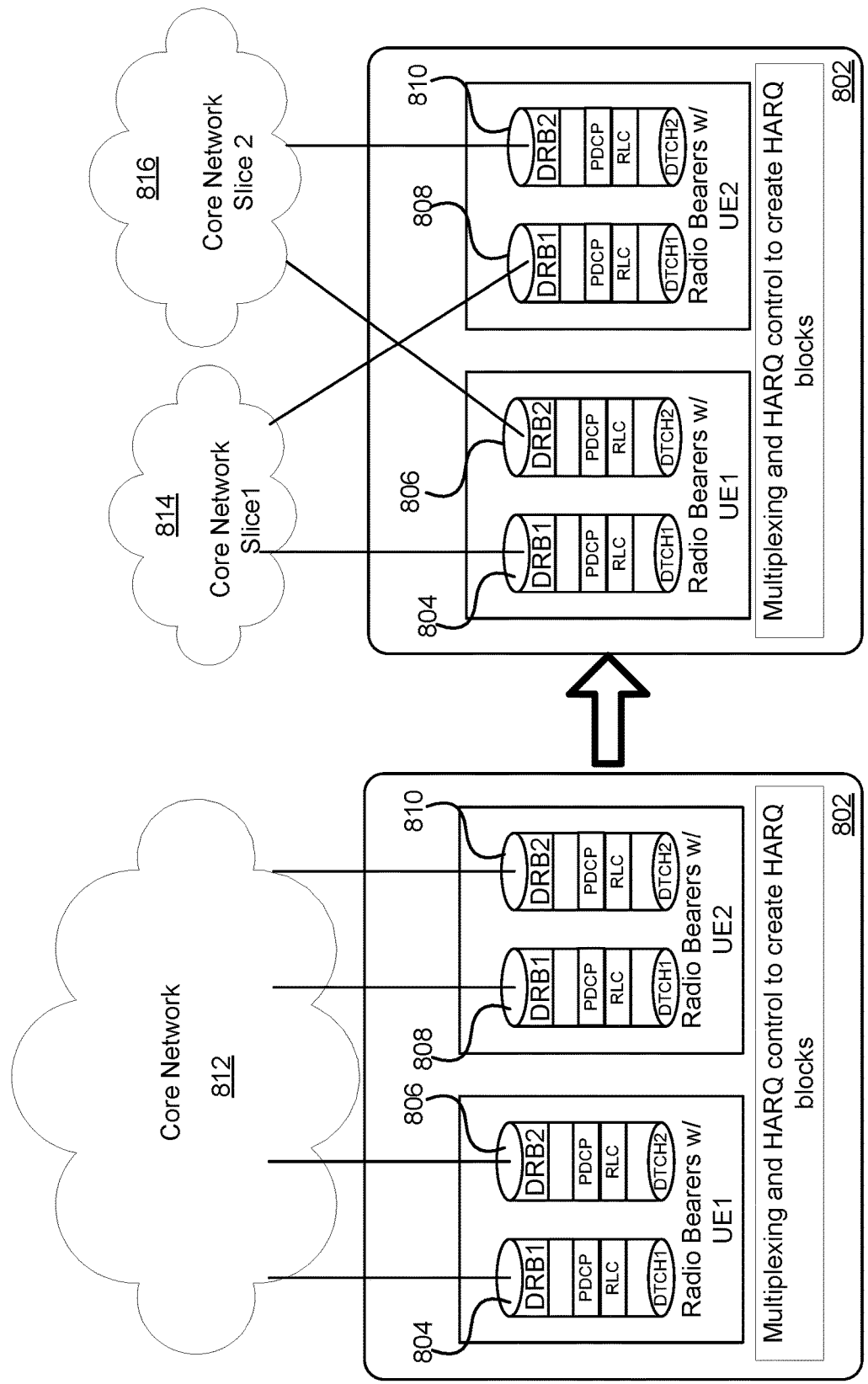
FIGS. 8A to 8C illustrate examples of mappings according to embodiments of the present invention.
Figure 8B:
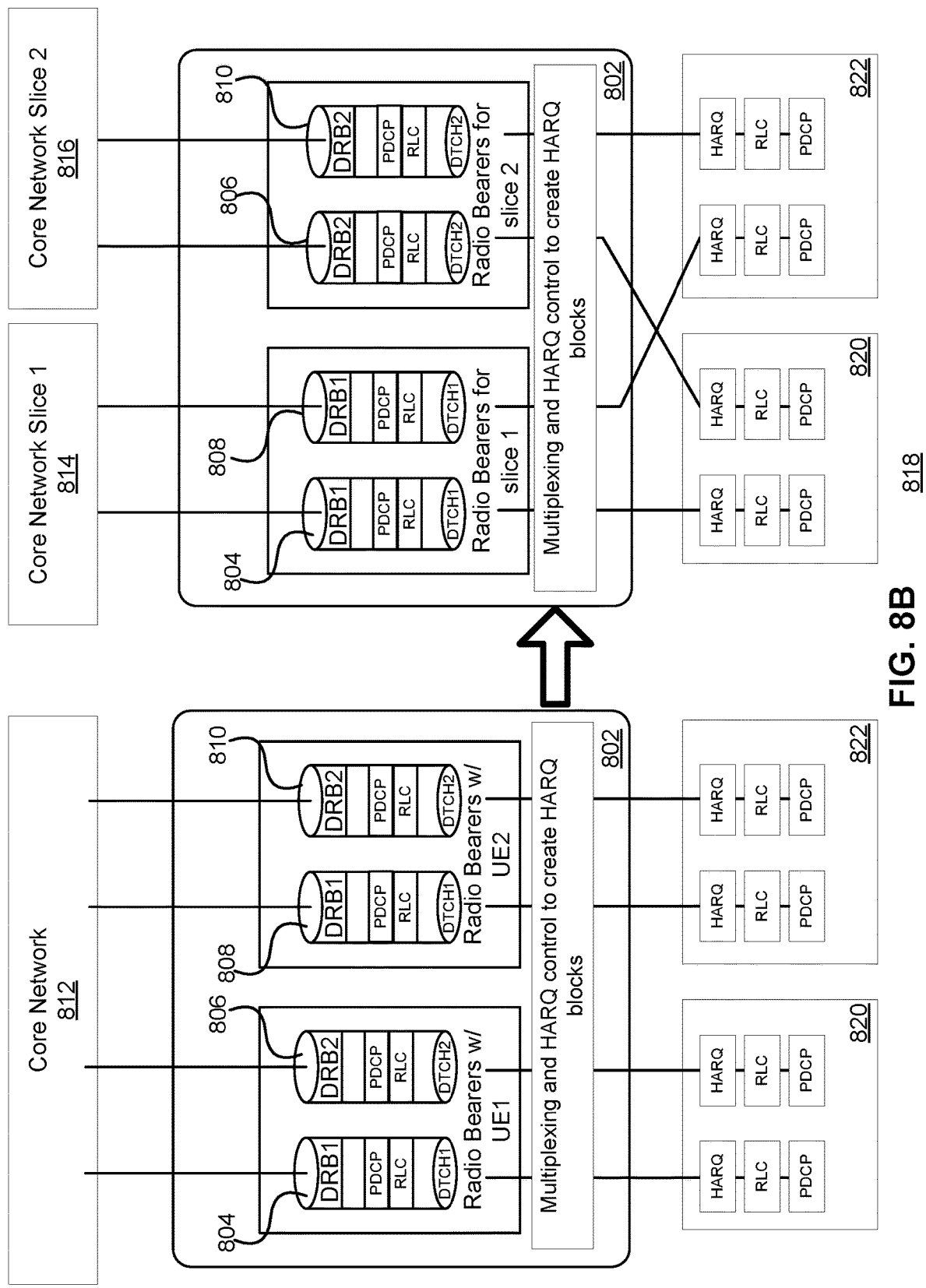
Figure 8C:
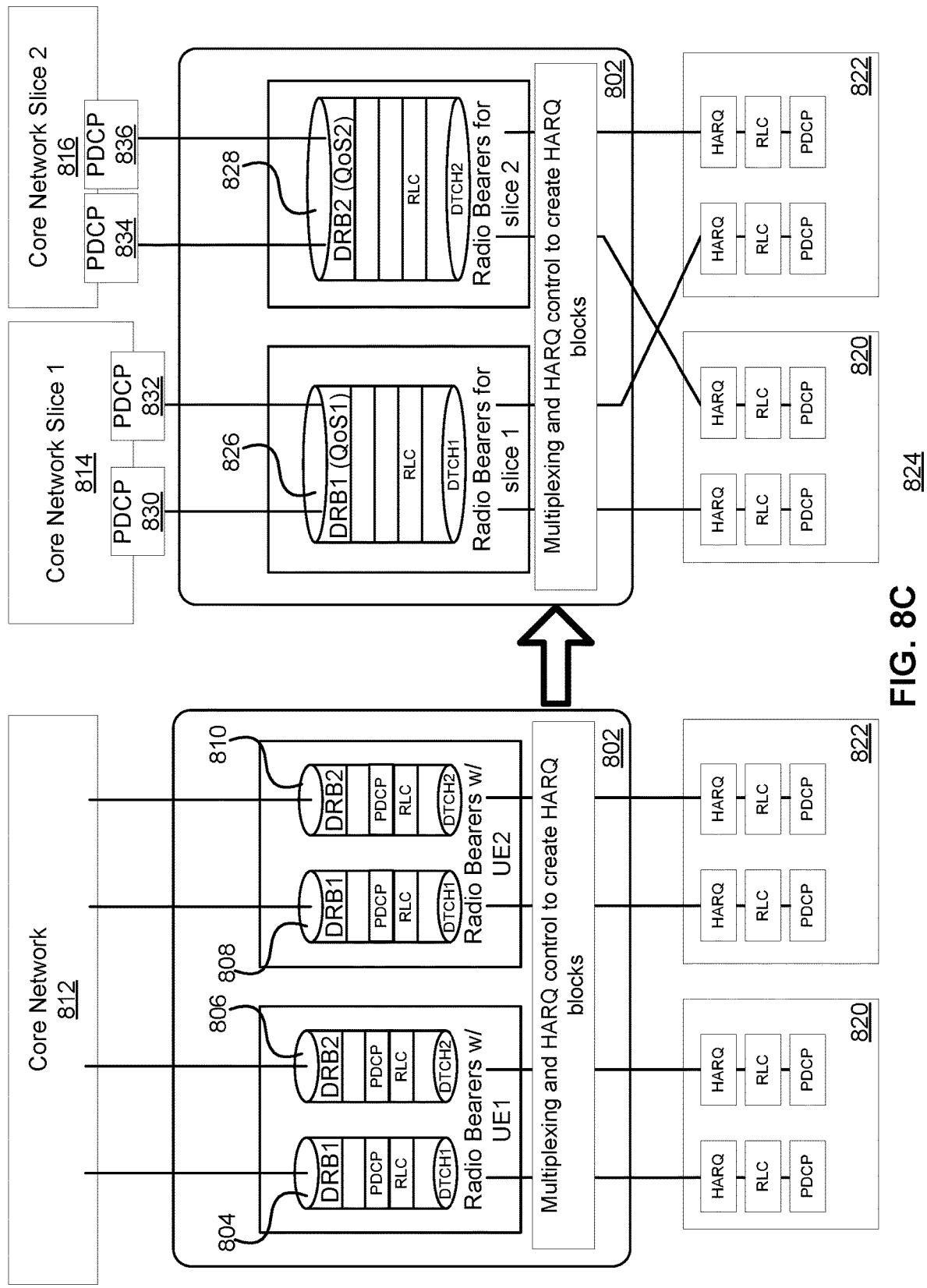

FIGS. 8A-C provide examples of how mappings can be performed and used. As will be understood in view of the following discussions, both security and authentication can be associated with the DRB (or with the slice-to-DRB mapping) to aid in the provision of per device security.

FIG. 8A illustrates the movement 800 from, on the left side, a conventional DRB mapping, where at an access node, a plurality of DRBs is associated with each UE (here illustrated as UE1 and UE2), to a DRB assignment to different services in different core network slices (shown on the right). Within an access node 802, DRB1 804 and DRB2 806 associated with UE1 are both sent to a gateway connecting the access node 802 with the single core network 812. Similarly, DRB1 808 and DRB2 810 associated with UE2 (which are distinct from the similarly named DRBs associated with UE1) also transmit received traffic to a gateway associated with the core network 812.

Using a change in logical assignments of where traffic on different DRBs is sent, as shown on the right side of the Figure, radio bearers 804 and 808 which are respectively associated with UE1 and UE2 by the access node 802 are configured to forward traffic received from the UEs to a core network slice 1 814. This is due to an association of these DRBs with a service within slice 1 814. Similarly, traffic received on Data Radio Bearers 809 and 810 are directed to core network slice 2 816.

Those skilled in the art will appreciate that each DRB has an associated packet data convergence protocol (PDCP) and Radio link control (RLC) layers, and may have defined Dedicated Traffic Channel (DTCH) assignments. There may be variance in the PDCP, RLC and DTCH configuration between DRBs, which would result in different DRB characteristics. The differences in these characteristics can be used to align traffic flows from the core network slices 814 and 816 with the appropriate DRB.

By configuring a DRB that is uniquely associated with a UE to be used exclusively for traffic associated with a service in a particular network slice, per device security can be configured, and per flow reliability can be offered within the limits of the available resources of the access node 800. A DRB with sufficient reliability and speed can be associated with traffic from a particular slice to provide a QoS based DRB mapping. From the perspective of the device, the PDCP, RLC and HARQ parameters can be provided to the UE, which will ensure the required QoS, without having to provide QoS information to the UE. When configured to transmit traffic received on a specified DRB to a particular core network slice, the requirement to do end-to-end bearer setup may be obviated. When the UE leaves the service range of the access node, the handover process can include the releasing (or resetting) of any DRB mapping.

FIG. 18B illustrates a configuration for an embodiment, in which an access node 1802 associates DRBs with the core network slices. As with the above embodiment, this may allow for per device security, and can be used to provide reliability on a per device flow basis. RAN slices can be associated with QoS requirements, and the parameters of DRB that can satisfy the requirements can be determined in advance. When a UE connects to the access node to attach to a service, the predetermined DRB parameters can be used to create a DRB to the UE that will map directly to the required network slice. Again, this can be used to avoid an end-to-end bearer setup, and handover procedures can include the resetting of the DRB assignment when a UE departs the service area.

As before, the configuration on the left side of the figure is shown, much as it is described in FIG. 18A. In addition, UEs 820 and 822 are illustrated. Within the UEs are functional configurations that show a matching of the required HARW, RLC and PDCP configuration associated with the Access node 802 and the DRB parameters. The configuration 818 on the right side of the figure shows the access node 1802 configured the group DRBs 804 and 808 with each other because of the connections to the core network slice 1 814. Similarly, DRBs 806 and 810 are grouped with each other because of the connections to core network slice 2 816. UE 820 has its second protocol stack which is associated with DRB 2 806 direct its traffic to the access node 802, where it is received over DRB2 806 and connected to the core network slice 2 816. It should be understood by those skilled in the art that the DRB parameters (e.g. the PDCP and RLC configurations) may be standardized across all the DRBs associated with a given core network slice. Thus, for example, DRB1 804 and DRB1 808 which correspond to UE1 820 and UE2 822 may have the same DRB parameters to ensure that they are both provided a similarly reliable connection.

FIG. 8C illustrates a DRB mapping embodiment 824 in which some embodiments can provide per device security and reliability as discussed above. The left side of FIG. 8C illustrates an embodiment in which UEs are each assigned unique DRBs that connect to a core network, as described above. On the right side, the configuration 824 illustrates a configuration in which both UE1 820 and UE2 822 can be considered, by the access node 802, to use a single DRB, DRB1 826, to connect to core network slice 1 814. The AN 802 can ignore the PDCP layer which is typically different for each UE, by moving the PDCP layer into core network slice 1 814. Thus, UE1 820 uses a PDCP configuration that is paired with the PDCP layer 830 in core network slice 1 814. It may use the same or a different PDCP configuration for traffic associated with core network slice 2 816 which will be handled by PDCP 834. In a configuration in which UE1 820 uses the same PDCP configuration for all traffic, PDCP 830 and PDCP 834 would be configured similarly, if not identically. Similarly, PDCP 832 and PDCP 836 are associated with traffic from UE 2 822. This allows access node 802 to treat all traffic as being associated with one of two DRBs. DRB1 826 is configured to support a first QoS level, while DRB2 828 is configured to support a second QoS level. Both QoS levels will be typically determined in accordance with the requirements specified by services in the corresponding core network slices.

It should be understood that the RLC and PDCP at the UE, is paired with the corresponding RLC and PDCP configurations at the radio bearer and core network slice. In some embodiments, the UE will support different RLC configurations for each DRB. As will be understood, this configuration can be used to provide per device security, channel reliability. The Radio Access Network is configured to associated radio bearers with core network slices to meet QoS requirements. There will be a matching RLC and HARQ process with the AN, and a match between the device and Core Network PDCP implementation. The device can be configured to support per slice radio bearer RLC, HARQ and PDCP. From the RLC configuration of the radio bearer, the PDCP Packet Data Units (PDUs) can be encapsulated within a single RLC PDU. Sequence Numbers can then be used to indicate the RLC PDUs, to allow for in order delivery. The use of a sequence number on the RLC PDU can be paired with a UE side acknowledgement process to alert the access node if an RLC PDU is lost. From the uplink perspective, this configuration allows for an assignment of the physical resources on a per device basis, to allow for transmission of the SN with the RLC. The UE can create an RLC PDU for transmission, and the network can use the same SN to ensure in sequence delivery (with a corresponding acknowledgement process as described above).

From the perspective of the network, the PDCP and per slice RLC should be configured, along with the AN HARQ process. Matching configurations can be sent to the UE for implementation. Upon UE handover, the slice RLC, HARQ and device PDCP configurations can be provided to the target location.

The configuration of FIG. 8C can also be used to provide a configuration that is used for per device security, along with in-sequence delivery. Preconfigured slice specific radio bearers can be prepared with defined QoS, RLC and HARQ configuration at the AN. The UE can then be configured with a slice specific radio bearer configuration for the RLC and device PDCP. A device specific PDCP configuration can be used to provide enhanced security. The Radio Access Node can be configured to map radio bearers with a HARQ and RLC configuration determined in accordance with a service with a network requirement for QoS. The Device can be configured with a slice specific radio bearer RLC and HARQ configuration, and a device specific PDCP. The network slice is then responsible for the PDCP, and an ensure that no PDCP PDUs associated with different devices are encapsulated into an RLC PDU. A Sequence Number (SN) can be introduced to indicate the slice specific RLC PDUs. In downlink communication, from the network slice, an SN on the RLC PDU can be paired with a device side acknowledgement process (e.g. ACK/NACK) on a per RB basis. Because the RB is associated with a slice, there is a complete RLC and PDCP acknowledgement.

In an uplink direction, the network can be configured to indicate that the assigned physical resource is associated with a particular device, and RLC PDUs can be tracked with an SN. At the device side, the UE can create an UL RLC PDU and transmit it through the defined DRB. The network can use the same SN to ensure in-sequence delivery and ack/nack to UL RLC PDU. The AN can be configured to setup the PDCP with the slice, and then use a slice specific RLC, in addition to a HARQ. When a UE is being handed over to another AN, the slice specific RLC configuration can be reset, and the HARQ configuration and device specific PDCP configuration details can be migrated to the target location.

As noted with reference to FIG. 8C, it is possible to move a device specific PDCP layer into the Network Slice associated with the DRB. It should be further understood that in some embodiments, the RLC layer can be removed from both the AN and the UE. This simplification, eliminates RLC processing, and can rely upon the PDCP (which can be implemented at the UE and in the connected slice) to provide both security and in sequence delivery. The AN can preconfigure the Radio Bearer, with a per slice HARQ configuration, and a device specific PDCP configuration. This simplified setup can reduce the setup to a definition of the PDCP parameters. In a handover situation, only the PDCP configuration information needs to be moved to the target location.

In another configuration, the PDCP configuration can be slice specific instead of device specific. This allows for an even more simplified configuration that makes use of slice wise ciphering (or possibly per slice/service ciphering) with an accompanying acceptance that there may not be a reliability requirement. There is a simplified per-slice RB mapping that provides the needed slice and security function (through a slice specific PDCP configuration). Upon connecting, the electronic device is configured for the slice RB HARQ and the implemented per slice PDCP. The UE may be required to obtain access link authorization prior to transmission. The handover process for this configuration may require key synchronization between the slice specific PDCPs.

Those skilled in the art will appreciate that the different configurations discussed above can be combined at a single AN. For example, a service that has a high requirement for security and reliability, may have an AN configuration as shown in 818 for a set of DRBs associated with a first core network slice, and a simplified slice specific PDCP configuration as discussed above for a second DRB associated with a second core network slice.

Figure 9:
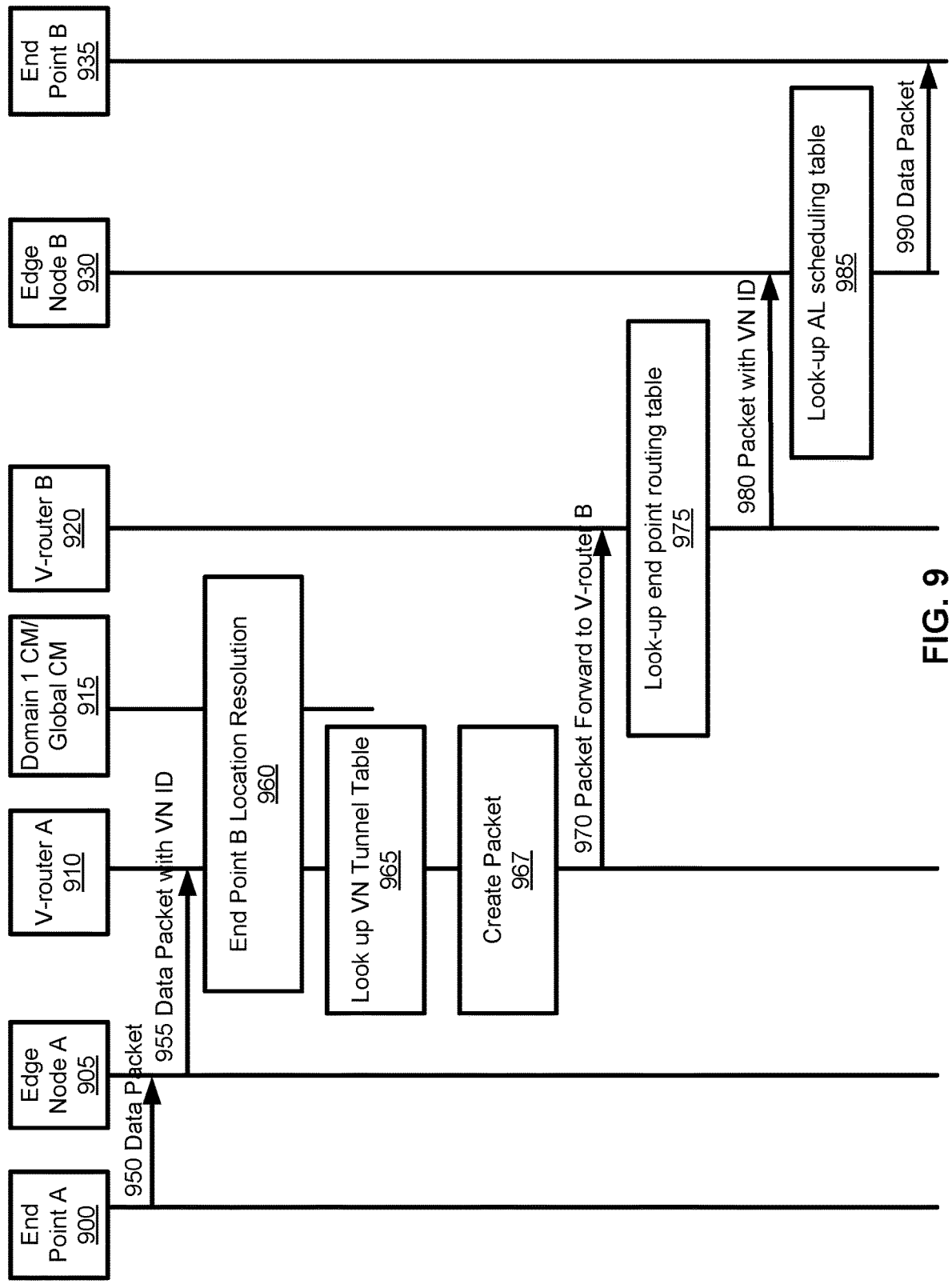
FIG. 9 illustrates an example communication procedure, according to embodiments of the present invention.

FIG. 9 is a signaling diagram illustrating an example of a hop-on procedure for a first end point A 900 transmitting a packet to another end point B 935. A service-based resource allocation is also assumed, in which dedicated VN and access link resources are allocated to this VN. In this assumption, dedicated access link resources are assigned to the VN for both transmission to and from the end points 900, 935 and all end points 900, 935 using the service share the same resources, so that there is no need to differentiate between end points 900, 935. By using dedicated access links, there is no signaling incurred for access link allocation or session establishment. On the network side, location resolution signaling is performed. End point A 900 is associated with an edge node A 905 and has a data packet to transmit to end point B 935 currently associated with edge node B 930. The VN ends at the access link and admission control is not used. It is assumed that the access links in both edge nodes 905, 930 correspond to dedicated resources for the virtual network being used.

In more detail, end point A 900 transmits 950 a data packet designating the VN is to be used and also designating the data packet is destined for end point B 935. The edge node A 905 detects that the packet is to be associated with the VN (or a service thereof) and forwards 955 the packet to the pre-configured next virtual node which hosts v-router A 910. In some embodiments, the edge node A 905 may encapsulate the packet prior to forwarding. The VN node 910 interacts with a CM 915 to perform a location resolution operation 960 for determining the current location of end point B 935. The CM 915 may be a domain-level CM or a global CM of a hierarchical CM entity. The VN node 910 then looks up 965 a VN tunnel table in order to determine which VN tunnel is to be used to forward the packet toward end point B 935 via edge node B 930 which is as indicated by the CM 915. The VN node 910 then creates and addresses 967 the tunnel packet. The VN node 910 then prepares and forwards 970 the packet to v-router B which is part of routing the packet toward edge node B 930 via an appropriate set of VN tunnels. The first tunnel is determined by the v-router at the VN node 910, with subsequent tunnels being determined by subsequent v-routers in a hop-by-hop manner. In the forwarding process, another VN node, holding v-router B 920 and serving as an anchor node for end point B 935, receives the packet and performs a lookup operation 975 in an end point routing table to determine that the packet is to be forwarded to edge node 930 which is operating as an edge node for end point B 935. The device routing table holds the association between end point B 935 and edge node 930. The v-router 920 then forwards 980 the packet to edge node 930. Edge node 930 looks up 985 scheduling information associated with the VN in an access link scheduling table. In the present example, edge node 930 determines that dedicated access link resources are to be used for transmitting the packet to end point B 935 according to the service, and that service based scheduling should be used. The edge node 930 then transmits 990 the packet to end point B 935 using these dedicated access link resources and service-based scheduling.

If the location of end point B 935 is fixed, location resolution may be omitted. It is also noted that one or both of end point A 900 and end point B 935 may be replaced with other types of end points, such as servers.

Figure 10:
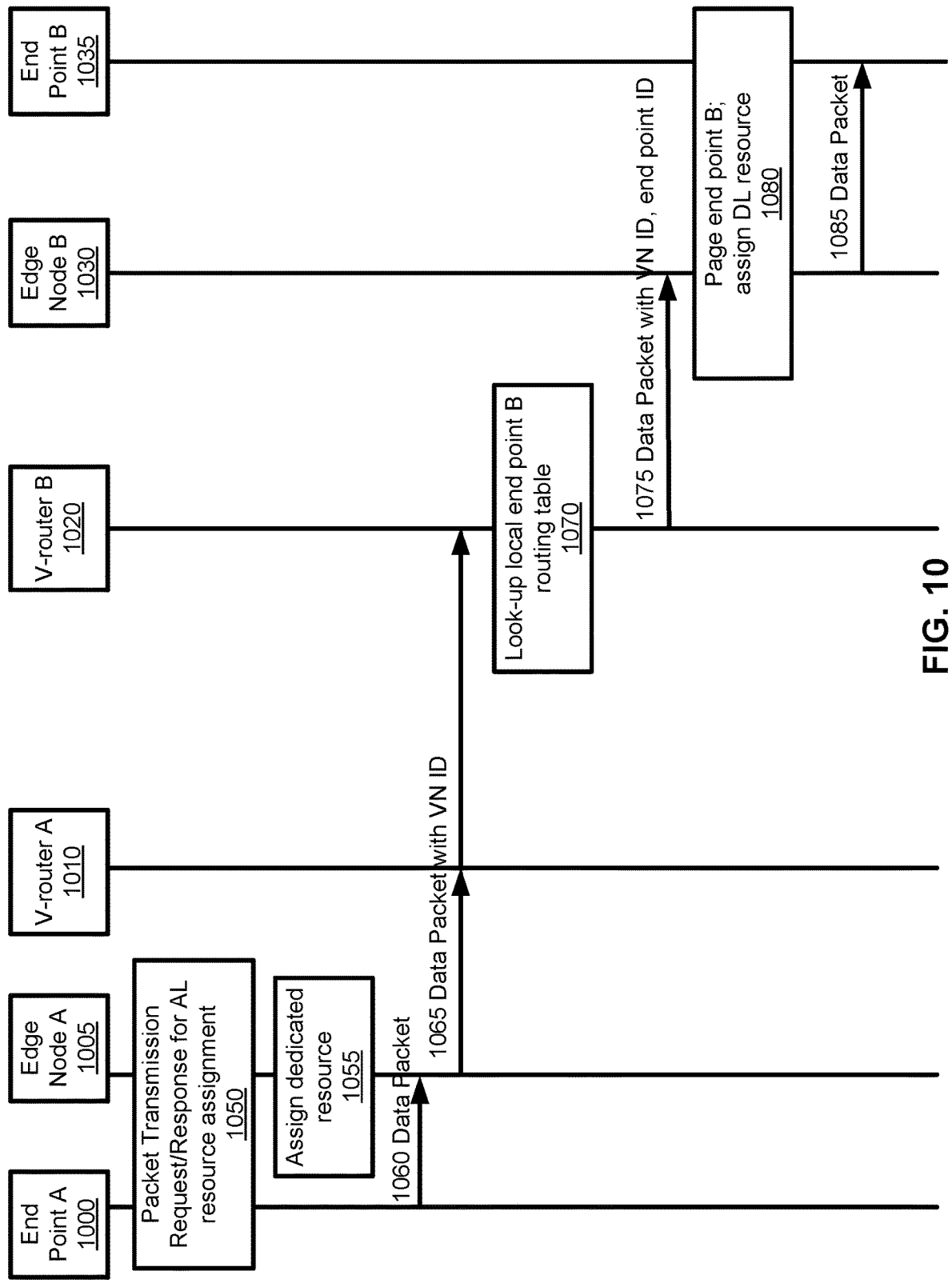
FIG. 10 illustrates another example communication procedure, according to embodiments of the present invention.

FIG. 10 is a signaling diagram illustrating an alternative example of UE traffic delivery by hop-on, in which the VN again allows hop-on without admission control. In FIG. 10, the VN ends at an edge node (e.g. access point). In this case the access link (AL) resources are assigned for a UE/session, and no session establishment set up at network side is required.

In more detail, end point A 1000 transmits 1050 a request for packet transmission permission and/or an assignment of access link resources. The request is transmitted to an edge node A 1005, and in response the edge node A 1005 transmits a resource assignment message to end point A 1000. An indication of the virtual network may be included in the request and/or response. The edge node A 1005 then assigns 1055 the dedicated resource, including a resource identifier, a device identifier and a virtual network identifier. End point A 1000 then transmits 1060 a data packet designating treatment by the VN, and designating end point B 1035 as a destination for the packet. The packet is then forwarded 1065 from the edge node A 1005 to v-router B 1020 to which end point B 1035 associates. For example, v-router B 1020 may be part of an anchor VN node for end point B 1035. The forwarding is performed via v-router A 1010 to which end point A 1000 associates, and may include routing via multiple v-routers, and location resolution requests and responses (not shown). V-router B 1020 performs a lookup operation 1070 to determine that edge node B 1030 is serving end point B 1035, and forwards 1075 the packet to edge node B 1030, including a designation of the virtual network, the identity of end point B, and other information such as a paging cycle for end point B. The edge node B 1030 pages 1080 end point B 1035 and assigns downlink resources for transmitting the packet to end point B after receiving a paging response. The edge node B 1030 then transmits 1085 the packet to end point B 1035 in accordance with the schedule.

For FIG. 10, it is noted that, in one embodiment, if the UEs are not mobile, the only signaling required is the signaling 1050 (transmission request and response) and 1080 (paging and response).

Figure 11:
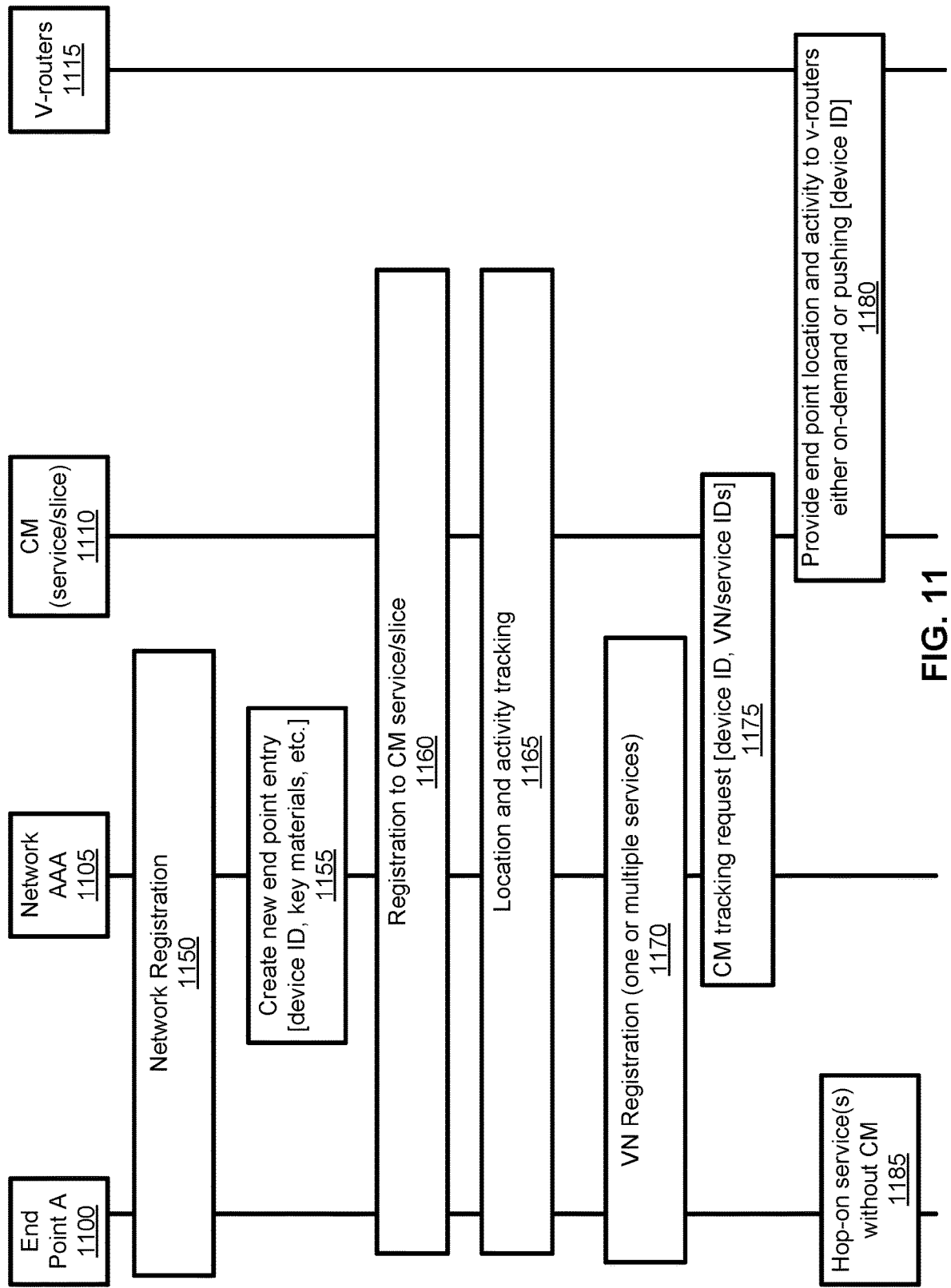
FIG. 11 illustrates an example pre-registration procedure, according to embodiments of the present invention.

FIG. 11 is a signaling diagram illustrating an example of operations required before hop-on, from the network perspective, according to an embodiment of the present invention. The illustrated process assumes that the logical connection between CMs and VN v-routers has been established (e.g. by SONAC-Com) during VN composition. In this process, no admission control is required.

In more detail, end point A 1100 performs a network registration operation 1150 in association with a network registration entity 1105. The network registration entity 1105 may be an authentication, authorization and accounting (AAA) server, for example. Network registration 1150 is separate from registration to a service or VN. The network registration entity 1105 creates 1155 a new database entry indicating the identity of end point A 1100, and encryption key materials. Following registration with the network, end point A 1100 registers 1160 to a CM 1110, which may reside in a network slice. The CM slice holds CM entities which begin tracking end point A 1100 upon registration. End point location tracking and end point activity tracking are subsequently performed 1165 by the CM entities following the registration. End point A 1100 subsequently registers 1170 with a VN, for example by interaction with the network registration entity 1105, to access one or more services. The network registration entity 1105 responds by submitting a tracking request 1175 to the CM slice 1110. The tracking request includes an identity of end point A 1100 and an indication of the VN (and service(s)) to which end point A 1100 has registered. Where a VN supports only a single service, then the VN ID may be used to identify that service. Where the VN supports multiple services, then the VN ID in combination with a service ID may be used to identify and distinguish between the services.

In response to the tracking request 1175, the CM entities begin providing 1180 location and activity status information for end point A 1100 to the v-routers 1115 of the VN. The information may be provided in a variety of ways, for example by providing information updates as changes to the status information are received, providing updates on a predetermined schedule, and/or providing updates upon request by the v-routers. Subsequently, end point A 1100 may "hop on" 1185 the VN by transmitting and/or receiving data packets.

Figure 12:
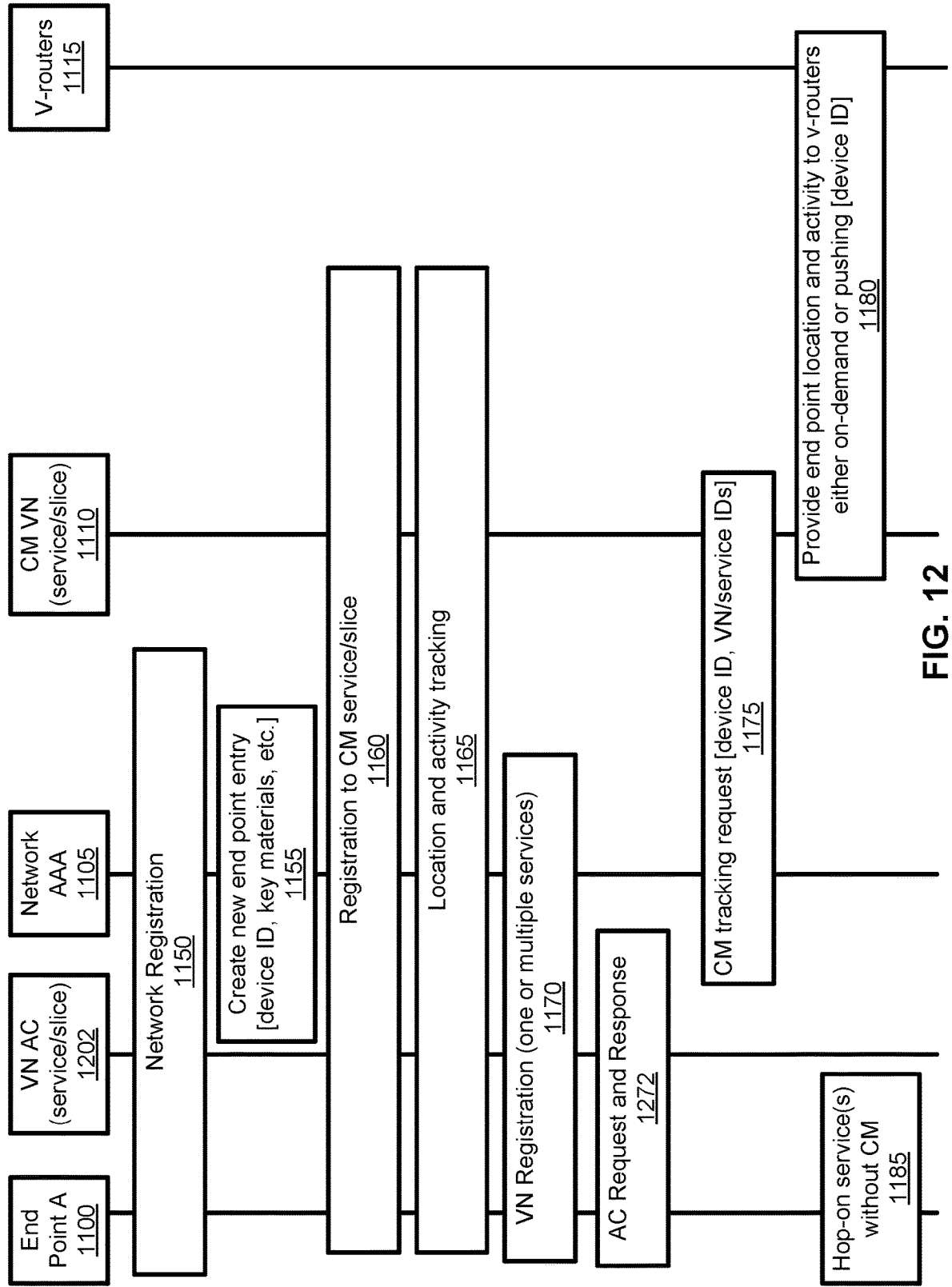
FIG. 12 illustrates another example pre-registration procedure, according to embodiments of the present invention.

FIG. 12 is a signaling diagram illustrating an example of the steps required before hop-on, from the network perspective, according to another embodiment of the present invention in which admission control is implemented. The illustrated process assumes that the logical connection between CMs and VN v-routers has been established during VN composition.

The procedure of FIG. 12 is similar to that of FIG. 11, and the description of similar elements is as described above. A per-VN (or per-slice or per-service) admission controller 1202 is provided. In this case, following registration 1170 of end point A 1100 to the VN, end point A 1100 transmits 1272 an admission or "hop on" request to the admission controller 1202 and receives a response from the admission controller 1202 indicative of whether the end point A 1100 is admitted to use the VN. If end point A is not admitted, the procedure terminates. If end point A is admitted, provision of location and activity status information for end point A 1100 to the v-routers of the VN commences as described above. Additionally, end point A 1100 may "hop on" 1185 the VN by transmitting and/or receiving data packets.

It is noted that, in FIGS. 11 and 12, end point A may be replaced with another type of end point, such as a server. When the end point is not mobile, location tracking may be omitted.

According to some embodiments, if an end point is fixed, dedicated resources are assigned for transmitting both from and to the end point, and there is no need to differentiate between different end points using an edge node, signaling-free hop-on can be enabled.

In one embodiment, access link resources for transmitting packets from end points to a VN are dedicated and there is no need to differentiate among end points. In this case, an end point can transmit a data packet to the VN using the dedicated access link resources to send data to a server without any signaling. This may be used for example for smart metering or similar applications. Similarly, if the server has a packet to transmit to one of the end points, the packet can be routed to an anchor VN node for the end point, and from there transmitted over a broadcast channel which is dedicated for use by the VN. Again this may be performed substantially without signalling overhead at the time of data transmission. VN router operations and interaction with physical network nodes are performed locally. When signaling overhead is reduced, latency is also reduced. When dedicated resources are assigned for tunnels of the VN, latency can be further reduced.

Alternatively, if there are no dedicated access link resources allocated to a VN, some access link signaling may be required for assigning resources for transmission both to and from end points. However, network side signaling may still be reduced.

Figure 13:
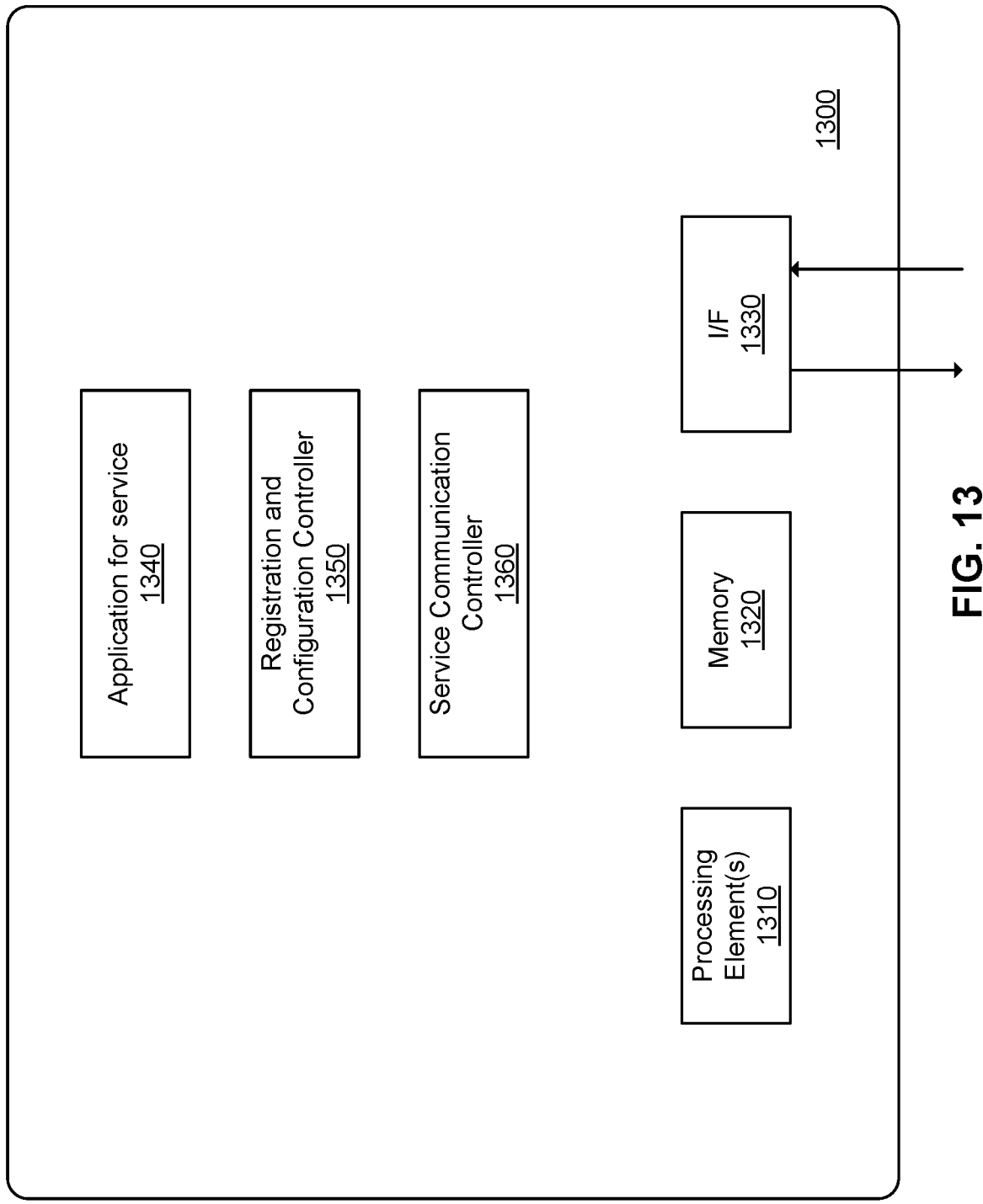
FIG. 13 illustrates an end point provided according to embodiments of the present invention.

FIG. 13 illustrates an end point 1300, such as a UE or server, provided in accordance with an embodiment of the present invention. The end point 1300 generally includes one or more processing elements such as a computer processor 1310, a memory 1320 and a communication interface 1330 such as a network interface or wireless transmitter and receiver. The end point may include an application 1340 which is associated with the service, for example which generates data for transmission to the service or relies on data received from the service. The end point includes a registration and configuration controller 1350 and a service communication controller 1360. The application 1340, registration and configuration controller 1350 and service communication controller 1360 may for example be provided by operation of the processor 1310 executing program instructions stored in the memory 1320.

The registration and configuration controller 1350 transmits (using the communication interface 1330) a registration message to the network via an edge node to register the end point with the service. Upon receipt of operating parameters from the edge node for use in accessing the service, the registration and configuration controller 1350 configures the service communication controller 1360 in accordance with the operating parameters. The service communication controller 1360 then causes the end point to utilize the operating parameters when interacting with the end point in association with the service. For example, the service communication controller 1360 may insert a VN ID and/or service ID into service-related packets to be transmitted. As another example, the service communication controller 1360 may cause the end point to use certain reserved access link resources when transmitting and/or receiving service-related packets.

Figure 14:
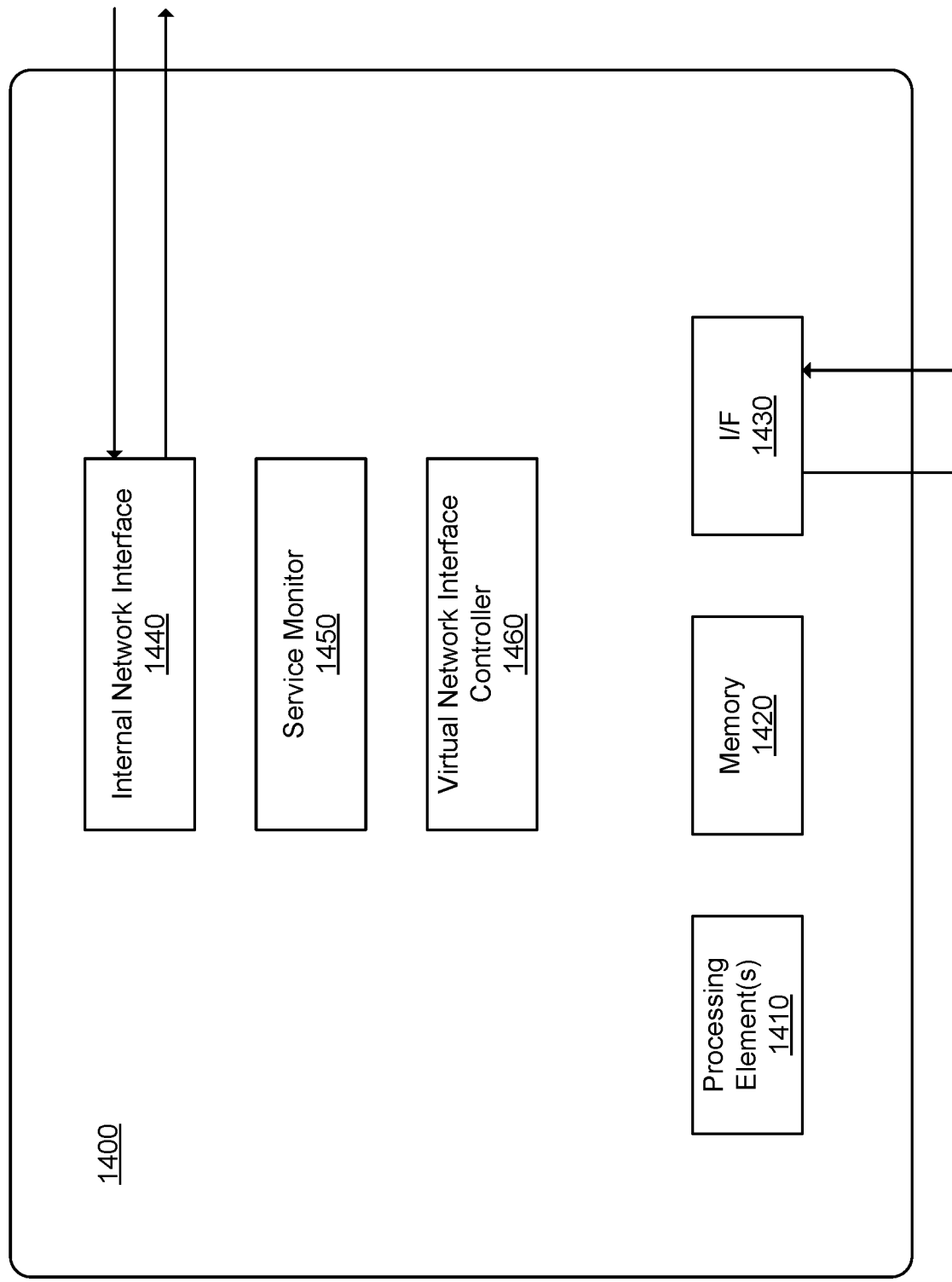
FIG. 14 illustrates an edge node provided according to embodiments of the present invention.

FIG. 14 illustrates an edge node 1400, such as a wireless access node or gateway, provided in accordance with an embodiment of the present invention. The edge node 1400 generally includes one or more processing elements such as a computer processor 1410, a memory 1420, an end point communication interface 1430 such as an external network interface or wireless transmitter and receiver, and an internal network interface 1440. The edge node includes a service monitor 1450 and a virtual network interface controller 1460. The service monitor 1450 and the virtual network interface controller 1460 may for example be provided by operation of the processor 1410 executing program instructions stored in the memory 1420.

The service monitor 1450 monitors for packets, transmitted by end points and associated with a service. The packets may be detected as being associated with a service by including an appropriate identifier, such as a service ID and/or a VN ID related to a VN supporting the service. The packets may be detected as being associated with a service at least in part via the access link resources used to transmit the packet, as inferred by the service monitor based on reception of the packet (e.g. based on timing of receipt, frequency band on which the signals conveying the packet are received, and/or codes used).

The service monitor 1450 provides packets which are determined to be associated with the service to the virtual network interface controller 1460. The virtual network interface controller 1460 then forwards such packets to the VN, for example to a VN node operating at the edge node or operating at another network node communicatively coupled to the edge node. The virtual network interface controller 1460 may mark the packets as being for handling by the VN and/or encapsulate the packets for transport using a tunnel supported by the VN.

Figure 15:
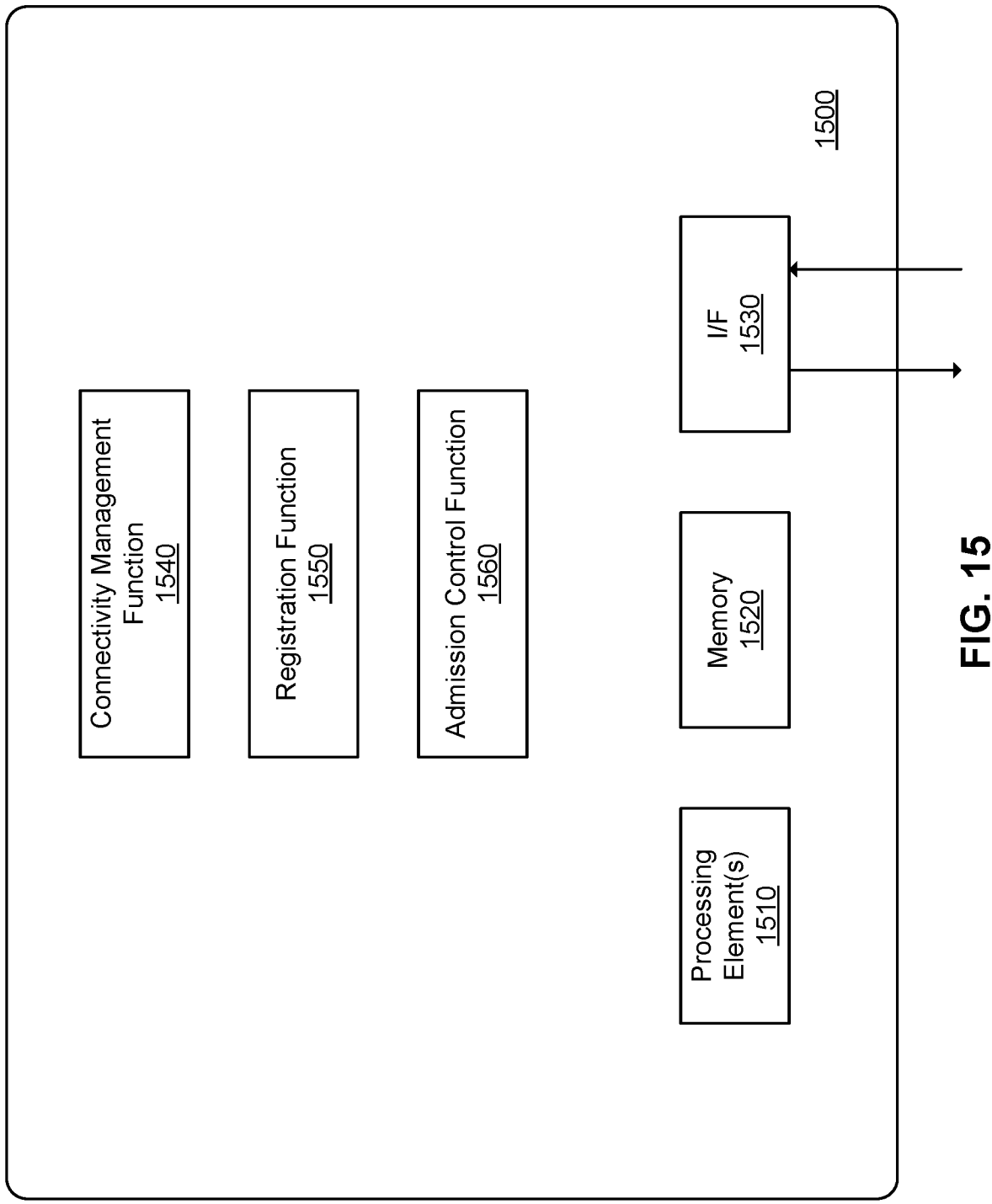
FIG. 15 illustrates another apparatus provided according to embodiments of the present invention.

FIG. 15 illustrates another apparatus 1500, which may be for example a connectivity manager, admission controller, or AAA server. The apparatus includes one or more processing elements such as a computer processor 1510, a memory 1520 such as an electronic computer memory, and a network interface 1530 configured to bi-directionally communicate with other network nodes in the communication network. In this and other apparatuses, the processor and memory configuration may be supplemented or replaced with other electronic hardware configured to perform a desired set of computing operations, such as integrated circuits or logic gate systems. The processor and memory (or other hardware components) may be operated to provide a desired functionality of the apparatus, for example by implementing a connectivity management function 1540 which registers and tracks end point locations and provides location updates to v-routers, a registration function 1550 which registers end points to a particular service and provides configuration information thereto, and an admission control function 1560 which receives and responds to admission control requests when an end point attempts to transmit service-related data via the VN.

Figure 16:
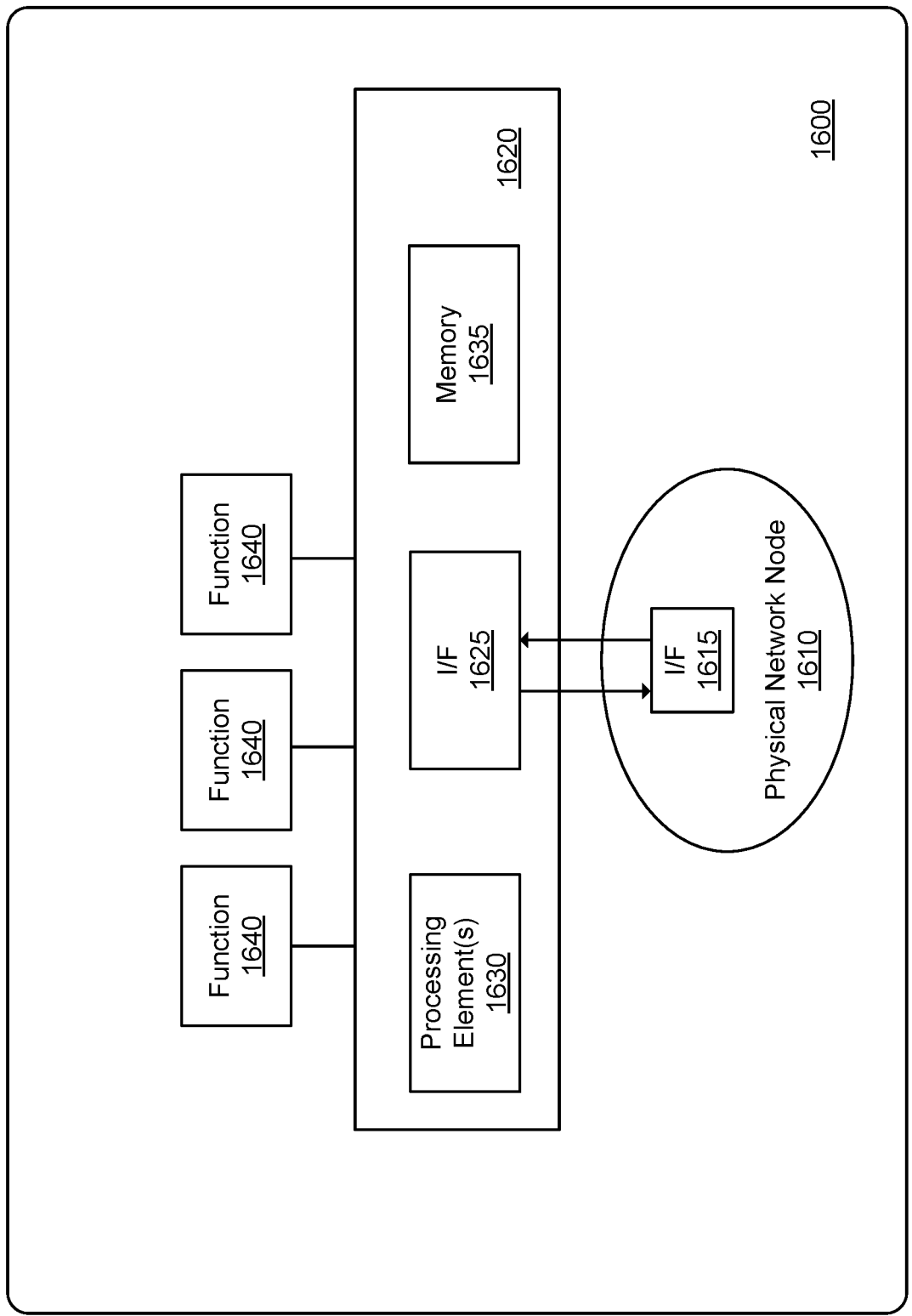
FIG. 16 illustrates yet another apparatus provided according to embodiments of the present invention.

FIG. 16 illustrates an apparatus 1600 in the network which is provided using a virtualization approach. The apparatus illustrated in FIGS. 14 and 15 may be virtualized, for example. The apparatus includes a physical node 1610, which may be a core network node or an edge node of the communication network. The physical node includes at least a communication interface 1615. The apparatus further includes cloud or data centre computing resources 1620 including one or more processing elements, such as computer processor(s) 1630 and memory resources 1635 that are allocated for use to the physical node 1610. The cloud/data centre resources 1620 are typically located at least partially remotely from the physical node 1610 and linked to the physical node 1610 via communication between the communication interface 1615 and a communication interface 1625 located in the cloud or data center. In other aspects, the cloud/data centre resources 1620 may be supported by one or more servers either co-located with the physical node 1610, or communicatively linked to the physical node 1610. The cloud/data centre resources 1620 may be used to implement one or more functions 1640 of the apparatus.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more processors operatively coupled to a corresponding set of memory components which include stored program instructions for execution by the processors. Computing resources may be used to provide virtual computing resources at one or more levels of virtualization. For example, one or more given generic computer hardware platforms may be used to provide one or more virtual computing machines. Computer hardware, such as processor resources and memory, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration as defined by the appended claims, and are contemplated to cover any and all modifications, variations, combinations or equivalents that fall within the scope of the present invention.

What is claimed is:

1. A method for accessing a service via a communication network including an edge node communicatively coupled to an end point, the method comprising, by the end point:
   transmitting a registration message to the edge node to register the end point with the service associated with a network slice;
   receiving from the edge node operating parameters for use in accessing the service;
   receiving a response to the registration message, the response identifying whether admission control is required to access the service; and
   when admission control is not required, transmitting or receiving a packet in accordance with the operating parameters.

2. The method of claim 1, further comprising the end point: registering with a connectivity management entity configured to track a location of the end point following the registration.

3. The method of claim 1, further comprising the end point: registering with the communication network prior to transmitting the registration message.

4. The method of claim 1, wherein the operating parameters include a radio identifier (ID) for use in communicating with the edge node, the radio ID associated, by the edge node, with the service.

5. The method of claim 1, wherein the end point interacts with the edge node or another edge node of the communication network to transmit or receive the packet.

6. The method of claim 1, wherein the end point receives the packet, the method further comprising, by the edge node:
   monitoring for the packet, the packet associated with the service and identifying the end point as a packet destination;
   upon detection of the packet, determining the operating parameters for use in communicating the packet to the end point, and transmitting the packet in accordance with the determined operating parameters,
   wherein the packet is received from a pre-configured virtual network supporting the network slice and the service.

7. The method of claim 6, wherein the edge node is a RAN cluster node, and wherein the operating parameters include a set of one or more access nodes to use for transmitting the packet.

8. The method of claim 6, wherein the determined operating parameters include one or both of: a set of access link resources to use for transmitting the packet; and a radio identifier (ID) of the end point to use for transmitting the packet, the radio ID associated, by the edge node, with the service.

9. The method of claim 6, wherein the end point is identified with a name identifier in the packet, and wherein said determining the operating parameters is based on the name identifier.

10. The method of claim 1, wherein the operating parameters indicate a set of pre-configured access link resources to be used for transmitting or receiving and the access link resources are dedicated to the service.

11. An apparatus comprising a processor coupled with a memory storing instructions when executed by the processor configure the processor to:
    transmit, via a communication interface of the apparatus, a registration message to a communication network to register the apparatus with a service, the service associated with a network slice; and
    receive from the network, via the communication interface, operating parameters for use in accessing the service;
    receive a response to the registration message, the response identifying whether admission control is required to access the service; and
    when admission control is not required, transmit or receive, via the communication interface, a packet in accordance with the operating parameters, thereby causing the packet to be associated with the service.

12. The apparatus of claim 11, further configured to register with a connectivity management entity configured to track a location of the apparatus following the registration.

13. The apparatus of claim 11, further configured to register with the communication network prior to transmitting the registration message.

14. The apparatus of claim 11, wherein the operating parameters include a radio identifier (ID) for use in communicating with an edge node via which the service is accessed, the edge node configured to associate the radio ID with the service.

15. The apparatus of claim 11, wherein the end point interacts with an edge node of the communication network to transmit or receive the packet.

16. The apparatus of claim 11, wherein the operating parameters indicate a set of pre-configured access link resources to be used for transmitting or receiving and the access link resources are dedicated to the service.

17. A system comprising:
    an end point for operation with a communication network to access a service, the end point configured to:
        transmit a registration message to the communication network to register the end point with the service, the service associated with a network slice;
        receive, from the network, operating parameters for use in accessing the service;
        receive a response to the registration message, the response identifying whether admission control is required to access the service; and
        when admission control is not required, transmit or receive each of one or more packets in accordance with the operating parameters, thereby causing the one or more packets to be associated with the service; and
    an edge node configured to:
        monitor for a packet belonging to the one or more packets, the packet to be received by the end point and being associated with the service, the packet identifying, as a packet destination, the end point communicatively coupled to the edge node; and
        upon detection of the packet or the other packet by the service monitor, to:
        determine parameters for use in communicating the packet or the other packet to the end point; and
        transmit the packet or the other packet in accordance with the determined parameters,
        wherein the packet is received from a pre-configured virtual network supporting the network slice and the service.

18. The system of claim 17, wherein one or more of the following hold:
    the edge node is a RAN cluster node, and the determined parameters include a set of one or more access nodes to use for transmitting the packet;
    the determined parameters include one or both of: a set of access link resources to use for transmitting the packet; and a radio identifier (ID) of the end point to use for transmitting the packet, the edge node configured to associate the radio ID with the service; and
    the end point is identified with a name identifier in the packet, and wherein said determining the parameters is based on the name identifier.

19. The system of claim 17, wherein the end point is further configured to register with the communication network prior to transmitting the registration message.

20. The system of claim 17, wherein the operating parameters indicate a set of pre-configured access link resources to be used for transmitting or receiving and the access link resources are dedicated to the service.

* * * * *